(12) United States Patent
Doi et al.

(10) Patent No.: US 10,105,929 B2
(45) Date of Patent: Oct. 23, 2018

(54) FOAMED SHEET

(71) Applicant: NITTO DENKO CORPORATION, Ibaraki-shi, Osaka (JP)

(72) Inventors: Kohei Doi, Ibaraki (JP); Kunio Nagasaki, Ibaraki (JP); Tetsuya Otsuka, Ibaraki (JP); Mika Okada, Ibaraki (JP); Kazumichi Kato, Ibaraki (JP); Hideyuki Tokuyama, Ibaraki (JP); Tsunaki Kitahara, Ibaraki (JP); Tadao Takahashi, Ibaraki (JP); Kiichiro Matsushita, Ibaraki (JP)

(73) Assignee: NITTO DENKO CORPORATION, Ibaraki-shi, Osaka (JP)

( * ) Notice: Subject to any disclaimer, the term of this patent is extended or adjusted under 35 U.S.C. 154(b) by 201 days.

(21) Appl. No.: 14/914,359

(22) PCT Filed: Aug. 21, 2014

(86) PCT No.: PCT/JP2014/071916
§ 371 (c)(1),
(2) Date: Feb. 25, 2016

(87) PCT Pub. No.: WO2015/029879
PCT Pub. Date: Mar. 5, 2015

(65) Prior Publication Data
US 2016/0221299 A1 Aug. 4, 2016

(30) Foreign Application Priority Data

Aug. 26, 2013 (JP) ................................. 2013-174860
Oct. 29, 2013 (JP) ................................. 2013-224692
Apr. 14, 2014 (JP) ................................. 2014-082569
Aug. 19, 2014 (JP) ................................. 2014-166424

(51) Int. Cl.
B32B 7/12 (2006.01)
B32B 5/18 (2006.01)
H04M 1/18 (2006.01)
H05K 5/00 (2006.01)
C08J 9/30 (2006.01)
C09J 7/02 (2006.01)
B32B 7/06 (2006.01)
B32B 27/06 (2006.01)
B32B 27/30 (2006.01)
B32B 27/36 (2006.01)
H04M 1/02 (2006.01)

(52) U.S. Cl.
CPC ................. B32B 5/18 (2013.01); B32B 7/06 (2013.01); B32B 7/12 (2013.01); B32B 27/065 (2013.01); B32B 27/308 (2013.01); B32B 27/36 (2013.01); C08J 9/30 (2013.01); C09J 7/0289 (2013.01); H04M 1/185 (2013.01); H05K 5/0017 (2013.01); B32B 2266/0207 (2013.01); B32B 2266/0221 (2013.01); B32B 2266/0242 (2013.01); B32B 2266/0278 (2013.01); B32B 2266/06 (2013.01); B32B 2307/302 (2013.01); B32B 2307/54 (2013.01); B32B 2307/546 (2013.01); B32B 2307/558 (2013.01); B32B 2307/56 (2013.01); B32B 2307/72 (2013.01); B32B 2307/732 (2013.01); B32B 2457/20 (2013.01); B32B 2571/00 (2013.01); C08J 2201/026 (2013.01); C08J 2201/0504 (2013.01); C08J 2205/05 (2013.01); C08J 2205/06 (2013.01); C08J 2309/04 (2013.01); C08J 2323/08 (2013.01); C08J 2333/08 (2013.01); C08J 2375/04 (2013.01); C09J 2201/606 (2013.01); C09J 2201/622 (2013.01); C09J 2203/318 (2013.01); C09J 2423/046 (2013.01); C09J 2431/006 (2013.01); C09J 2433/006 (2013.01); C09J 2475/006 (2013.01); H04M 1/0266 (2013.01)

(58) Field of Classification Search
CPC ................ B32B 5/18; B32B 7/06; B32B 7/12
See application file for complete search history.

(56) References Cited

U.S. PATENT DOCUMENTS

| | | |
|---|---|---|
| 2005/0031858 A1 | 2/2005 | Tachibana |
| 2006/0005606 A1 | 1/2006 | Hatanaka et al. |
| 2010/0068452 A1 | 3/2010 | Kusanose et al. |
| 2010/0239836 A1 | 9/2010 | Kato et al. |
| 2013/0324629 A1 | 12/2013 | Kanada et al. |
| 2014/0004288 A1 | 1/2014 | Wakayama et al. |
| 2014/0356615 A1 | 12/2014 | Komatsuzaki et al. |

FOREIGN PATENT DOCUMENTS

| | | |
|---|---|---|
| CN | 101935416 A | 1/2011 |
| JP | 2001-100216 A | 4/2001 |
| JP | 2002-309198 A | 10/2002 |
| JP | 2002-363330 A | 12/2002 |
| JP | 2004-161987 A | 6/2004 |

(Continued)

OTHER PUBLICATIONS

Translation of JP 2010-260880. See IDS filed Feb. 25, 2016 for date and inventor.*

(Continued)

Primary Examiner — Victor S Chang
(74) Attorney, Agent, or Firm — Sughrue Mion, PLLC

(57) ABSTRACT

A foamed sheet according to the present invention has a thickness of 30 to 500 μm and includes a foam. The foam has a density of 0.2 to 0.7 g/cm$^3$, an average cell diameter of 10 to 150 μm, and a peak top of loss tangent (tan δ) occurring in a temperature range of from −30° C. to 30° C., where the loss tangent is defined as the ratio of a loss modulus to a storage modulus determined at an angular frequency of 1 rad/s in dynamic viscoelastic measurement of the foam. The foam preferably has a maximum of the loss tangent (tan δ) in the temperature range of from −30° C. to 30° C. of 0.2 or more.

17 Claims, 1 Drawing Sheet

(56) References Cited

FOREIGN PATENT DOCUMENTS

| | | |
|---|---|---|
| JP | 2004-196921 A | 7/2004 |
| JP | 2006-47277 A | 2/2006 |
| JP | 2009-108314 A | 5/2009 |
| JP | 2010-084798 A | 4/2010 |
| JP | 2010-215805 A | 9/2010 |
| JP | 2010-260880 A | 11/2010 |
| JP | 2012-184403 A | 9/2012 |
| WO | 2008/102761 A1 | 8/2008 |
| WO | 2012/081561 A1 | 6/2012 |
| WO | 2012/111443 A1 | 8/2012 |
| WO | 2013/099755 A1 | 7/2013 |
| WO | 2013/191222 A1 | 12/2013 |

OTHER PUBLICATIONS

Communication dated Oct. 2, 2017 from the European Patent Office in counterpart Application No. 14 839 830.8.
Extended European Search Report dated Feb. 6, 2017 from the European Patent Office in counterpart application No. 14839830.8.
International Search Report for PCT/JP2014/071916 dated Sep. 16, 2014.
Notification of Reasons for Rejection dated Apr. 24, 2018 from the Japanese Patent Office in counterpart Japanese application No. 2014-166424.
First Office Action dated Feb. 23, 2018 from the State Intellectual Property Office of the P.R.C. in counterpart Application No. 201480047086.1.

* cited by examiner

FOAMED SHEET

CROSS REFERENCE TO RELATED APPLICATIONS

This application is a National Stage of International Application No. PCT/JP2014/071916 filed Aug. 21, 2014, claiming priority based on Japanese Patent Application Nos. 2013-174860 filed Aug. 26, 2013, 2013-224692 filed Oct. 29, 2013, 2014-082569 filed Apr. 14, 2014, and 2014-166424 filed Aug. 19, 2014, the contents of all of which are incorporated herein by reference in their entirety.

TECHNICAL FIELD

The present invention relates to a foamed sheet that has excellent impact absorption even when having a small thickness, and to an electrical/electronic device including the foamed sheet.

BACKGROUND ART

Foamed materials (foams) have been used to secure image display members, display members, and other optical members (e.g., cameras and lenses) to predetermined regions (e.g., cabinets), where the image display members are to be secured to image display devices such as liquid crystal displays, electroluminescence displays, and plasma displays; and the display members and other optical members are to be mounted typically to so-called "cellular phones", "smartphones", and "personal digital assistants". Examples of the foamed materials to be used include low-expansion (high-density) microcellular urethane foams having a closed-cell structure; foams prepared from high-expansion (low-density) polyurethanes via compression molding; and polyethylene foams including closed cells and having an expansion ratio of about 30. Specifically, examples of the foamed materials to be used include a gasket including a polyurethane foam having a density of 0.3 to 0.5 g/cm$^3$ (see Patent Literature (PTL) 1); and a sealant for electrical/electronic devices, where the sealant includes a foam structure having an average cell diameter of 1 to 500 μm (see PTL 2).

However, with decreasing thicknesses of products to which the optical members (e.g., image display devices, cameras, and lenses) are to be mounted, clearances of portions at which the foamed materials are used tend to significantly decrease. With decreasing clearances, the foamed materials have to have smaller thicknesses. However, conventional foamed materials fail to offer sufficient impact absorption when having such smaller thicknesses. Accordingly, demands have been made to provide foamed sheets for use typically in "smartphones" and other electrical/electronic devices with display members, where, when the electrical/electronic devices are dropped off typically onto the ground, the foamed sheets absorb impacts upon collision with the ground and eliminate or minimize the failure of the display members.

Independently, shock absorbing sheets are used for eliminating or minimizing the failure typically of display members in electronic devices such as personal computers (PCs), tablet PCs, personal digital assistants (PDAs), and cellular phones. As the electronic devices increase in functionality, the shock absorbing sheets are laminated with other members (e.g., thermally-conductive layers) and integrated into the electronic devices. Further reduction in thickness of the electronic devices demands further reduction in thickness of members such as the shock absorbing sheets to be used in the electronic devices. This demands reduction in thickness of, or disuse of, an adhesive layer upon lamination of the shock absorbing sheets with the other members.

CITATION LIST

Patent Literature

PTL 1: Japanese Unexamined Patent Application Publication (JP-A) No. 2001-100216
PTL 2: JP-A No. 2002-309198

SUMMARY OF INVENTION

Technical Problem

Accordingly, the present invention has an object to provide a foamed sheet that offers excellent impact absorption even when the foamed sheet has a very small thickness.

The present invention has another object to provide a foamed sheet that has the property and still eliminates or minimizes misregistration upon lamination with another member even if the foamed sheet does not have an adhesive layer.

In addition, the present invention has still another object to provide an electrical/electronic device that is resistant to failure due to drop impacts even when the device is reduced in size and/or thickness.

Solution to Problem

After intensive investigations to achieve the objects, the inventors of the present invention have found a foamed sheet including a foam that has a specific density and a specific average cell diameter and has a peak top of loss tangent (tan δ) occurring in a temperature range of from −30° C. to 30° C., where the loss tangent (tan δ) is defined as the ratio of a loss modulus to a storage modulus determined at an angular frequency of 1 rad/s in dynamic viscoelastic measurement of the foam. The inventors have further found that the foamed sheet has significantly excellent impact absorption even though having a small thickness of 30 to 500 μm; and that the foamed sheet, when used in an electrical/electronic device, causes the electrical/electronic device to resist the failure of a display device or any other component due typically to drop impacts onto the ground. The present invention has been made based on these findings.

Specifically, the present invention provides a foamed sheet having a thickness of 30 to 500 μm and includes a foam. The foam has a density of 0.2 to 0.7 g/cm$^3$ and an average cell diameter of 10 to 150 μm and has a peak top of loss tangent (tan δ) occurring in a temperature range of from −30° C. to 30° C., where the loss tangent (tan δ) is defined as the ratio of a loss modulus to a storage modulus each determined at an angular frequency of 1 rad/s in dynamic viscoelastic measurement of the foam.

In the foamed sheet, the foam preferably has a maximum of loss tangent (tan δ) of 0.2 or more in the temperature range of from −30° C. to 30° C.

The foam preferably has an initial elastic modulus of 5 N/mm$^2$ or less in a tensile test at a tensile speed of 300 mm/min at an ambient temperature of 23° C.

In the foamed sheet, a value R is preferably 0.15 or more at an impactor weight of 28 g and a rise angle of 40° and is preferably 0.10 or more at an impactor weight of 96 g and a rise angle of 47°, where the value R is determined by dividing an impact absorption rate (%) by the thickness (μm) of the foamed sheet, and where the impact absorption rate is determined in an impact test using a pendulum impact tester and specified by the expression:

Impact absorption rate (%)=[($F_0$−$F_1$)/$F_0$]×100 where $F_0$ represents an impact force upon collision of the impactor with a backing plate alone; and $F_1$ represents an impact force upon collision of the impactor with the backing plate in a structure including the backing plate and the foamed sheet.

At least one side of the foam preferably has a shear bond strength of 0.5 N/100 mm² or more to a SUS 304BA plate, where the shear bond strength is determined at 23° C. and at a tensile speed of 50 mm/min.

The foam may be derived from (formed from) at least one resinous material selected from the group consisting of acrylic polymers, rubbers, urethane polymers, and ethylene-vinyl acetate copolymers.

The foam may be formed via a step A of mechanically foaming an emulsion resin composition. The foam may be formed further via a step B of applying the mechanically foamed emulsion resin composition onto a substrate and drying the applied composition. The step B may include a preliminary drying step B1 and a drying step B2. In the preliminary drying step B1, the bubble-containing (foamed) emulsion resin composition applied on the substrate is dried at a temperature of from 50° C. to lower than 125° C. In the drying step B2, the preliminary dried composition is further dried at a temperature of from 125° C. to 200° C.

The foamed sheet may further include a pressure-sensitive adhesive layer on or above at least one side of the foam.

The foamed sheet may be used as a shock absorbing sheet for electrical/electronic devices.

The present invention provides, in another embodiment, an electrical/electronic device including the foamed sheet.

The electrical/electronic device includes an electrical/electronic device further including a display member and a cabinet. This electrical/electronic device has such a structure that the foamed sheet is held between the cabinet and the display member.

Advantageous Effects of Invention

The foamed sheet according to the present invention includes a foam that has the specific density and the specific average cell diameter and has a peak top of loss tangent (tan δ) occurring in a temperature range of from −30° C. to 30° C., where the loss tangent (tan δ) is defined as a ratio of a loss modulus to a storage modulus each determined at an angular frequency of 1 rad/s in dynamic viscoelastic measurement of the foam. This configuration makes the foamed sheet have excellent impact absorption even when having a small thickness. In an embodiment, at least one side of the foam has a shear bond strength of 0.5 N/100 mm² or more to a SUS 304BA plate. The foamed sheet in this embodiment resists misregistration upon lamination with another member (e.g., thermoelectric layer) even when the foamed sheet does not have an adhesive layer. In addition, the foamed sheet according to the present invention, when used in an electrical/electronic device, eliminates or minimizes the failure of the electrical/electronic device due typically to drop impacts onto the ground.

DESCRIPTION OF EMBODIMENTS

Figure 1:
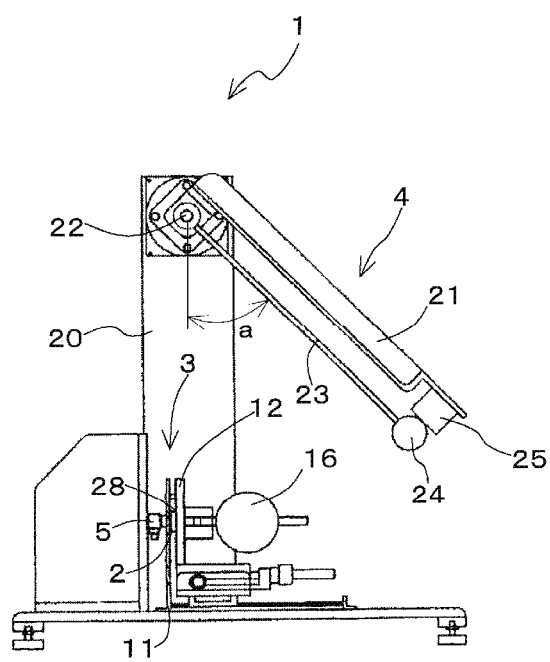
FIG. 1 is a schematic view of a pendulum impact tester (impact testing apparatus)

The foamed sheet according to the present invention has a thickness of 30 to 500 μm and includes a foam. The foam has a density of 0.2 to 0.7 g/cm³ and an average cell diameter of 10 to 150 μm and has a peak top of loss tangent (tan δ) occurring in a temperature range of from −30° C. to 30° C., where the loss tangent (tan δ) is defined as a ratio of a loss modulus to a storage modulus each determined at an angular frequency of 1 rad/s in dynamic viscoelastic measurement of the foam. The foamed sheet therefore offers desired impact absorption. As used herein the term "density" of the foam refers to an "apparent density".

The foamed sheet according to the present invention has a thickness of 30 to 500 μm. Of the thickness, the lower limit is preferably 40 μm and more preferably 50 μm; and the upper limit is preferably 400 μm, more preferably 300 μm, and furthermore preferably 200 μm. The foamed sheet according to the present invention, as having a thickness of 30 μm or more, uniformly contains cells (bubbles) and offers excellent impact absorption. In addition, the foamed sheet, as having a thickness of 500 μm or less, is capable of readily conforming even to a fine clearance. The foamed sheet according to the present invention has excellent impact absorption even though having a small thickness of 30 to 500 μm.

The foam constituting the foamed sheet according to the present invention has a density of 0.2 to 0.7 g/cm³. Of the density, the lower limit is preferably 0.21 g/cm³ and more preferably 0.22 g/cm³; and the upper limit is preferably 0.6 g/cm³, more preferably 0.5 g/cm³, and furthermore preferably 0.4 g/cm³. The foam, as having a density of 0.2 g/cm³ or more, maintains strength at a certain level. The foam, as having a density of 0.7 g/cm³ or less, offers good impact absorption. The foam, as having a density of from 0.2 to 0.4 g/cm³, offers still better impact absorption.

The foam has an average cell diameter of 10 to 150 μm. Of the average cell diameter, the lower limit is preferably 15 μm and more preferably 20 μm; and the upper limit is preferably 140 μm, more preferably 130 μm, and furthermore preferably 100 μm. The foam, as having an average cell diameter of 10 μm or more, offers excellent impact absorption. The foam, as having an average cell diameter of 100 μm or less, also has excellent compression recovery. The foam has a maximum cell diameter of typically 40 to 400 μm. Of the maximum cell diameter, the lower limit is preferably 60 μm and more preferably 80 μm; and the upper limit is preferably 300 μm and more preferably 220 μm. The foam has a minimum cell diameter of typically 5 to 70 μm. Of the minimum cell diameter, the lower limit is preferably 8 μm and more preferably 10 μm; and the upper limit is preferably 60 μm and more preferably 50 μm.

The ratio of the average cell diameter (μm) of the foam to the thickness (μm) of the foamed sheet is preferably from 0.2 to 0.9 in the present invention. This range is preferred from the viewpoint of impact absorption. Of the ratio of average cell diameter (μm) to the foamed sheet thickness (μm), the lower limit is preferably 0.25 and more preferably 0.3; and the upper limit is preferably 0.85 and more preferably 0.8.

The foam has a peak top of loss tangent (tan δ) occurring in a temperature range of from −30° C. to 30° C., where the loss tangent (tan δ) is defined as the ratio of the loss modulus to the storage modulus each determined at an angular frequency of 1 rad/s in dynamic viscoelastic measurement of the foam. Of the temperature range where the loss tangent peak top occurs, the lower limit is preferably −25° C., more preferably −20° C., and furthermore preferably −10° C.; and the upper limit is preferably 20° C. and more preferably 10° C. When the foam (material) has two or more peak tops of the loss tangent, at least one of the peak tops preferably occurs within the range. The foam, as having a peak temperature of −30° C. or higher, offers excellent compression recovery. The foam, as having a peak temperature of 30° C. or lower, presents high flexibility and offers excellent impact absorption.

The loss tangent (tan δ) preferably has a high peak top intensity (maximum) in the temperature range of from −30° C. to 30° C. from the viewpoint of impact absorption. The peak top intensity is typically 0.2 or more, and preferably 0.3 or more. The upper limit of the peak top intensity (maximum) is typically 2.0.

As described above, the peak temperature and the peak top intensity of the loss tangent (tan δ) significantly affect the impact absorption of the foam. When the peak top of the loss tangent (tan δ) occurs in the temperature range of from −30° C. to 30° C., the foamed sheet offers better impact absorption, where the loss tangent is defined as the ratio of the loss modulus to the storage modulus determined at an angular frequency of 1 rad/s in dynamic viscoelastic measurement of the foam. This is probably because the peak of the loss tangent (tan δ) occurs in such a region as to meet the frequency of the impact, although all reasons for this are not clarified. Specifically, the range of the loss tangent (tan δ) of from −30° C. to 30° C. is converted into a range of frequency corresponding to the drop impact of a structure by the principle of time-temperature equivalence (time-temperature superposition) in viscoelastic measurement. Accordingly, a foamed sheet having a peak temperature of the loss tangent (tan δ) occurring in a temperature range of from −30° C. to 30° C. is supposed to have better impact absorption. The storage modulus indicates the resiliency against impact energy applied to the foamed sheet. The foamed sheet (foam), when having a high storage modulus, repels the impact as intact. In contrast, the loss modulus indicates such a property as to convert impact energy applied to the foamed sheet into heat. With an increasing loss modulus, the foamed sheet (foam) converts the impact energy into heat, absorbs the impact, and reduces the strain to greater extents. Based on this, it is supposed that a foamed sheet has a higher impact absorption rate when the foamed sheet converts more impact into heat and has lower resiliency, namely, has a higher loss tangent (tan δ), where the loss tangent is the ratio of the loss modulus to the storage modulus.

The foam desirably has a lower initial elastic modulus from the viewpoint of impact absorption. The initial elastic modulus is preferably 5 N/mm$^2$ or less and more preferably 3 N/mm$^2$ or less. The initial elastic modulus is a value calculated from a slope of a curve at 10% strain, where the curve is plotted in a tensile test performed at a tensile speed of 300 mm/min and at an ambient temperature of 23° C. The lower limit of the initial elastic modulus is typically 0.1 N/mm$^2$.

The foam constituting the foamed sheet according to the present invention is not limited in factors or conditions such as composition and cell structure, as long as having the above-mentioned properties. Regarding the cell structure, the foam may have any of open-cell structure, closed-cell structures, and semi-open semi-closed cell structures. Among them, open-cell structures and semi-open semi-closed cell structures are preferred from the viewpoint of impact absorption.

The foamed sheet according to the present invention has a small thickness, yet has excellent impact absorption. The foamed sheet offers excellent impact absorption regardless of the impact magnitude. For example, an impact test using a pendulum impact tester is performed to determine an impact absorption rate (%) specified by an expression above. The impact absorption rate (%) is then divided by the foamed sheet thickness (μm) to give a value R as an impact absorption rate per unit thickness.

Impact absorption rate (%)=[($F_0$−$F_1$)/$F_0$]×100 where $F_0$ represents an impact force upon collision of an impactor with a backing plate alone; and $F_1$ represents an impact force upon collision of the impactor with the backing plate in a structure including the backing plate and the foamed sheet.

Assume that R measured under a low-impact condition is defined as R1, and R measured under a high-impact condition is defined as R2, where the measurement under the "low-impact condition" is performed at an impactor weight of 28 g and a rise angle of 40'; and the measurement under the "high-impact condition" is performed at an impactor weight of 96 g and a rise angle of 47°. The foamed sheet according to the present invention has an R1 of typically 0.15 or more and an R2 of typically 0.10 or more. The upper limits of Rs (R1 and R2) are each typically about 0.5.

Further assume that R measured at an impactor weight of 96 g and a rise angle of 30° is defined as R3, where the R is the impact absorption rate per unit thickness. The foamed sheet according to the present invention has an R3 of typically 0.15 or more, preferably 0.17 or more, and furthermore preferably 0.19 or more. The upper limit of R3 is typically about 0.5.

The impact absorption rate may vary depending typically on the foamed sheet thickness, but is generally 5% to 70%. Of the impact absorption rate, the lower limit is preferably 7%; and the upper limit is preferably 60%. The impact absorption rate (%), when measured at an impactor weight of 96 g and a rise angle of 30°, is preferably 15% or more, more preferably 17% or more, and furthermore preferably 19% or more.

The foamed sheet according to the present invention has excellent impact absorption regardless of the impact magnitude, as described above. For example, the foamed sheet according to the present invention has a total of R1 and R2 (R1+R2) of generally 0.25 or more (e.g., 0.25 to 1.0), and preferably 0.28 or more (e.g., 0.28 to 1.0) and has an R1 to R2 ratio (R1/R2) of generally from 0.5 to 3.0, and preferably from 0.8 to 2.8. In addition, the foamed sheet according to the present invention has a difference between R1 and R2 (R1−R2) of generally within ±0.25, and preferably within ±0.21.

Figure 2:
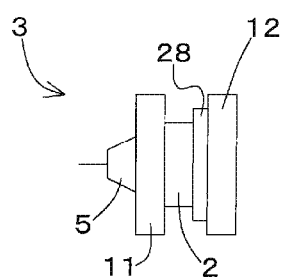
FIG. 2 illustrates a schematic configuration of a holder of the pendulum impact tester (impact testing apparatus).

The pendulum impact tester (impact testing apparatus) will be illustrated on its schematic configuration with reference to FIGS. 1 and 2. As illustrated in FIGS. 1 and 2, an impact testing apparatus 1 (pendulum impact tester 1) includes, for example, a holder 3, an impact loader 4, and a pressure sensor 5. The holder 3 acts as a holding means to hold a test specimen 2 (foamed sheet 2) at any holding power. The impact loader 4 applies impact stress to the test specimen 2. The pressure sensor 5 acts as an impact force detecting means to detect the impact force applied by the impact loader 4 to the test specimen 2. The holder 3, which holds the test specimen 2 at any holding power, includes a fixture 11 and a presser 12. The presser 12 faces the fixture 11 and is configured to be slidable so that the test specimen 2 is held between the presser 12 and the fixture 11. The presser 12 is equipped with a pressing force controller 16. The impact loader 4, which applies the impact force to the test specimen 2 held by the holder 3, includes a pendulum arm 23 (shaft 23) and an arm 21. The pendulum arm 23 is pivotally supported at one end 22 by a supporting column 20 and has an impactor 24 at the other end. The arm 21 raises the impactor 24 to a predetermined angle and holds the impactor at that angle. In this example, a steel ball is used as the impactor 24. The arm is equipped with an electromagnet 25 at one end so as to raise the impactor 24 together with the electromagnet 25 up to the predetermined angle. In addition, the pressure sensor 5, which detects the impact force applied by the impact loader 4 to the test specimen 2, is disposed on the fixture 11 on an opposite side to the side with which the test specimen comes into contact.

The impactor 24 is a steel ball (iron ball). The impactor 24 is raised by the arm 21 at an angle (rise angle "a" in FIG. 1) of about 30° to about 47° (in working examples, measurements were performed at three different angles of 30°, 40°, and 47°). The steel ball (iron ball) has a weight of about 20 to about 100 g. In the after-mentioned examples (working examples), measurements were performed under three different conditions of (1) at a steel ball (iron ball) weight of 28 g and a rise angle of 40°, (2) at a steel ball (iron ball) weight of 96 g and a rise angle of 47°, and (3) at a steel ball (iron ball) weight of 96 g and a rise angle of 30°.

As illustrated in FIG. 2, the test specimen 2 (foamed sheet 2) is held between the fixture 11 and the presser 12 via a backing plate 28. The baking plate includes a highly elastic plate which is exemplified by, but not limited to, resinous plates such as acrylic plates and polycarbonate plates; and metallic plates.

The impact absorption is measured using the impact testing apparatus in the following manner. Initially, an impact force $F_0$ is measured by bringing the fixture 11 into intimate contrast with the backing plate 28 and securing them with each other, and then allowing the impactor 24 to collide with the backing plate 28. In addition, an impact force $F_1$ is measured by placing the test specimen 2 into between the fixture 11 and the backing plate 28, securing them in intimate contact, and then allowing the impactor 24 to collide with the backing plate 28. The impact absorption is determined from $F_0$ and $F_1$ according to an expression below. The impact testing apparatus is as with the apparatus according to Embodiment 1 of JP-A No. 2006-47277.

The impact absorption of a foamed sheet having a certain level of thickness can be adjusted by selecting properties such as average cell diameter and density. However, a foamed sheet, when having a very small thickness (e.g., thickness of 30 to 500 μm), may fail to absorb impacts sufficiently merely by adjusting these properties. This is because cells in a foam of such a very thin foamed sheet are readily crushed due to the impacts, and the foamed sheet loses the shock absorbing function (impact cushioning function) by the action of the cells. In contrast, the constituent material of the foam in the foamed sheet according to the present invention offers the impact cushioning function even after the cells are crushed. This is because the foam is configured to have a peak top of loss tangent (tan δ) occurring in a temperature range of from −30° C. to 30° C., as described above, where the loss tangent is defined as the ratio of a loss modulus to a storage modulus at an angular frequency of 1 rad/s in dynamic viscoelastic measurement of the foam.

The foam may be derived from a resin composition including a resinous material (polymer). The resin composition in an unexpanded state (unexpanded resin composition (solid)) preferably has a peak top of loss tangent (tan δ) occurring in the temperature range of from −30° C. to 30° C., where the loss tangent is defined as the ratio of a loss modulus to a storage modulus at an angular frequency of 1 rad/s in dynamic viscoelastic measurement of the resin composition. Of the temperature range where the peak top of the loss tangent occurs, the lower limit is preferably −25° C., more preferably −20° C., and furthermore preferably −10° C.; and the upper limit is preferably 20° C. and more preferably 10° C. When the resin composition has two or more peak tops of the loss tangent, at least one of the peak tops preferably occurs within the range. The resin composition (solid) preferably has a higher intensity of the peak top of the loss tangent (tan δ) in the temperature range of from −30° C. to 30° C. This is preferred from the viewpoint of impact absorption. The peak top intensity corresponds to a value determined by dividing the peak top intensity of the loss tangent (tan δ) of the foam in the temperature range of from −30° C. to lower than 30° C. by the foam density ($g/cm^3$). For example, the peak top intensity of the loss tangent (tan δ) of the resin composition (solid) in the temperature range of from −30° C. to 30° C. is preferably 0.9 $(g/cm^3)^{-1}$ or more; and the upper limit thereof is typically about 3.

The initial elastic modulus (at 23° C. and at a tensile speed of 300 mm/min) of the resin composition in an unexpanded state (solid) is desirably lower, and is preferably 50 $N/mm^2$ or less, and more preferably 30 $N/mm^2$ or less. The lower limit of the initial elastic modulus is typically 0.3 $N/mm^2$.

The resinous material (polymer) constituting the foam is not limited and may be selected from publicly known or well known resinous materials that constitute foams. Examples of the resinous material include, but are not limited to, acrylic polymers, rubbers, urethane polymers, and ethylene-vinyl acetate copolymers. Among them, acrylic polymers, rubbers, and urethane polymers are preferred from the viewpoint of impact absorption. The foam may be derived from each of different resinous materials (polymers) alone or in combination.

The peak top of the loss tangent (tan δ) may be controlled to occur in the temperature range of from −30° C. to 30° C. typically with a glass transition temperature Tg of the resinous material (polymer) as an index or guide, where the loss tangent is specified as the ratio of the loss modulus to the storage modulus of the foam at an angular frequency of 1 rad/s in dynamic viscoelastic measurement. For example, the resinous material (polymer) may be selected from resinous materials (polymers) having a glass transition temperature Tg of from −50° C. to lower than 50° C. Of the glass transition temperature Tg, the lower limit is preferably −40° C. and more preferably −30° C.; and the upper limit is preferably 40° C. and more preferably 30° C.

Of the acrylic polymers, preferred is an acrylic polymer derived from monomer components essentially including both a monomer that gives a homopolymer having a glass transition temperature Tg of −10° C. or higher; and a monomer that gives a homopolymer having a glass transition temperature Tg of lower than −10° C. By using the acrylic polymer and adjusting the proportions in amounts of the former monomer and the latter monomer, a foam having a peak top of the loss tangent (tan δ) occurring within a temperature range of from −30° C. to 30° C. is relatively easily obtained, where the loss tangent is defined as the ratio of the loss modulus to the storage modulus at an angular frequency of 1 rad/s in dynamic viscoelastic measurement of the foam.

As used herein the term "glass transition temperature Tg upon formation of a homopolymer" refers to the "glass transition temperature Tg of a homopolymer of the monomer" and is also simply referred to as "homopolymer Tg". Specifically, values of the homopolymer Tg can be found typically in "Polymer Handbook" (Third Edition, John Wiley & Sons, Inc., 1987). The glass transition temperature Tg of a homopolymer of a monomer not found in the literature may be defined as a value determined typically by the following measurement method (see JP-A No. 2007-51271). Specifically, 100 parts by weight of the monomer, 0.2 part by weight of 2,2'-azobisisobutyronitrile, and 200 parts by weight of ethyl acetate as a polymerization solvent were charged into a reactor equipped with a thermometer, a stirrer, a nitrogen inlet tube, and a reflux condenser, followed by stirring for one hour with introduction of nitrogen gas. After purging of oxygen from the reaction system in this manner, the temperature is raised up to 63° C., followed by a reaction for 10 hours. Next, the resulting mixture is cooled down to room temperature and yields a homopolymer solution having a solids concentration of 33% by weight. Next, the homopolymer solution is applied onto a separator by flow casting, is dried, and yields a test sample (sheet-form homopolymer) having a thickness of about 2 mm. The test sample is blanked into a disc having a diameter of 7.9 mm, and the disc-shaped sample is held between parallel plates. The viscoelasticity of the sample is measured using a rheometer (ARES, supplied by Rheometrics) in a shear mode in the temperature range of −70° C. to 150° C. at a rate of temperature rise of 5° C./min while applying a shear strain at a frequency of 1 Hz. The determined peak top temperature of tan δ is defined as the glass transition temperature Tg of the homopolymer (homopolymer Tg). The glass transition temperature Tg of the resinous material (polymer) may also be measured by the method.

In the monomer having a homopolymer Tg of −10° C. or higher, the homopolymer Tg is typically −10° C. to 250° C., preferably 10° C. to 230° C., and furthermore preferably 50° C. to 200° C.

Examples of the monomer having a homopolymer Tg of −10° C. or higher include, but are not limited to, (meth)acrylonitriles; amido-containing monomers such as (meth)acrylamides and N-hydroxyethyl(meth)acrylamides; (meth)acrylic acids; (meth)acrylic alkyl esters each having a homopolymer Tg of −10° C. or higher, such as methyl methacrylate and ethyl methacrylate; isobornyl (meth)acrylates; heterocycle-containing vinyl monomers such as N-vinyl-2-pyrrolidone; and hydroxy-containing monomers such as 2-hydroxyethyl methacrylate. Each of them may be used alone or in combination. Among them, (meth)acrylonitriles are preferred, of which acrylonitrile is particularly preferred. The (meth)acrylonitriles (in particular, acrylonitrile), when used as the monomer having a homopolymer Tg of −10° C. or higher, may allow the foam to have a higher peak top intensity of the loss tangent (tan δ). This is probably because of strong intermolecular interaction.

In the monomer having a homopolymer Tg of lower than −10° C., the homopolymer Tg is typically from −70° C. to lower than −10° C., preferably −70° C. to −12° C., and furthermore preferably −65° C. to −15° C.

Examples of the monomer having a homopolymer Tg of lower than −10° C. include, but are not limited to, (meth)acrylic alkyl esters having a homopolymer Tg of lower than −10° C., such as ethyl acrylate, butyl acrylate, and 2-ethylhexyl acrylate. Each of them may be used alone or in combination. Among them, $C_2$-$C_8$ alkyl esters of acrylic acid are preferred.

The content of the monomer having a homopolymer Tg of −10° C. or higher is typically 2% to 30% by weight of all monomer components (total amount of monomer components) to form the acrylic polymer. Of the content, the lower limit is preferably 3% by weight and more preferably 4% by weight; and the upper limit is preferably 25% by weight and more preferably 20% by weight. The content of the monomer having a homopolymer Tg of lower than −10° C. is typically 70% to 98% by weight of all monomer components (total amount of monomer components) to form the acrylic polymer. Of the content, the lower limit is preferably 75% by weight and more preferably 80% by weight; and the upper limit is preferably 97% by weight and more preferably 96% by weight.

The monomers to form the acrylic polymer, when including a nitrogen-containing copolymerizable monomer, gives a foam having excellent foaming properties. This is because as follows. Assume that the monomers are formulated into an emulsion resin composition, and the emulsion resin composition is foamed (expanded) by applying shear to the composition typically via mechanical stirring. In this process, the composition offers a lower viscosity to include many bubbles into the emulsion to give a foamed (bubble-containing) emulsion resin composition. The bubble-containing emulsion resin composition, when applied onto a substrate and dried as being left stand, more readily undergoes agglutination to have a higher viscosity. This allows the bubbles to remain in the composition and to resist diffusion to the outside.

Examples of the nitrogen-containing copolymerizable monomer (nitrogen-containing monomer) include, but are not limited to, cyano-containing monomers such as (meth)acrylonitriles; lactam-ring-containing monomers such as N-vinyl-2-pyrrolidone; and amido-containing monomers such as (meth)acrylamides, N-hydroxyethyl(meth)acrylamides, N-methylolacrylamide, N,N-dimethylacrylamide, N,N-diethylacrylamide, and diacetoneacrylamide. Among them, preferred are cyano-containing monomers such as acrylonitrile; and lactam-ring-containing monomers such as N-vinyl-2-pyrrolidone. Each of different nitrogen-containing monomers may be used alone or in combination.

In such an acrylic polymer including a structural unit derived from the nitrogen-containing monomer, the content of the structural unit derived from the nitrogen-containing monomer is preferably 2% to 30% by weight of all structural units constituting the acrylic polymer. Of the content, the lower limit is more preferably 3% by weight, and furthermore preferably 4% by weight; and the upper limit is more preferably 25% by weight, and furthermore preferably 20% by weight.

The acrylic polymer including the structural unit derived from the nitrogen-containing monomer preferably further includes a structural unit derived from a $C_2$-$C_{18}$ alkyl ester of acrylic acid in addition to the structural unit derived from the nitrogen-containing monomer. Of such $C_2$-$C_{18}$ alkyl esters of acrylic acid, $C_2$-$C_8$ alkyl esters of acrylic acid are preferred. Each of different $C_2$-$C_{18}$ alkyl esters of acrylic acid may be used alone or in combination. The content of the structural unit(s) derived from a $C_2$-$C_{18}$ alkyl ester of acrylic acid (in particular, a $C_2$-$C_8$ alkyl ester of acrylic acid) in the acrylic polymer is preferably 70% to 98% by weight of all structural units constituting the acrylic polymer. Of the content, the lower limit is more preferably 75% by weight, and furthermore preferably 80% by weight; and the upper limit is more preferably 97% by weight, and furthermore preferably 96% by weight.

The rubbers may be either of natural rubbers and synthetic rubbers. Examples of the rubbers include, but are not limited to, nitrile rubbers (NBRs), methyl methacrylate-butadiene rubbers (MBRs), styrene-butadiene rubbers (SBRs), acrylic rubbers (ACMs, ANMs), polyurethane rubbers (AUs), and silicone rubbers. Among them, preferred are nitrile rubbers (NBRs), methyl methacrylate-butadiene rubbers (MBRs), and silicone rubbers.

Examples of the urethane polymers include, but are not limited to, polycarbonate polyurethanes, a polyester polyurethanes, and polyether polyurethanes.

Non-limiting examples of the ethylene-vinyl acetate copolymers include publicly known or well known ethylene-vinyl acetate copolymers.

The foam constituting the foamed sheet may further include one or more additives as needed in addition to the resinous material (polymer). Examples of the additives include surfactants, crosslinkers, thickeners, and rust inhibitors, and any other additives.

For example, the foam may include any surfactant so as to give a smaller cell diameter and better stability of formed foams (cells). The surfactant is not limited and may be any of anionic surfactants, cationic surfactants, nonionic surfactants, amphoteric surfactants, and any other surfactants. Among them, anionic surfactants are preferred, of which ammonium fatty acid salts such as ammonium stearate are more preferred, from the viewpoints of smaller cell diameters and better stability of formed foams. Each of different surfactants may be used alone or in combination. Two or more surfactants of different kinds may be used in combination. Typically, an anionic surfactant and a nonionic surfactant may be used in combination; and an anionic surfactant and an amphoteric surfactant may be used in combination.

The amount (solids content (non-volatile content)) of the surfactant(s) is typically 0 to 10 parts by weight per 100 parts by weight (solids content (non-volatile content)) of the resinous material (polymer). Of the amount, the lower limit is preferably 0.5 part by weight; and the upper limit is preferably 8 parts by weight.

The foam may include any crosslinker so as to have strength, thermal stability, and moisture resistance at higher levels. The crosslinker is not limited and may be any of oil-soluble ones and water-soluble ones. Examples of the crosslinker include, but are not limited to, epoxide-, oxazoline-, isocyanate-, carbodiimide-, melamine-, and metal oxide-crosslinkers. Among them, oxazoline crosslinkers are preferred.

The amount (solids content (non-volatile content)) of the crosslinker is typically 0 to 10 parts by weight per 100 parts by weight (solids content (non-volatile content)) of the resinous material (polymer). Of the amount, the lower limit is preferably 0.01 part by weight; and the upper limit is preferably 9 parts by weight.

In addition, the foam may include any thickener so as to have stability of the formed foams and film-formability at higher levels. Non-limiting examples of the thickener include acrylic acid-, urethane-, and poly(vinyl alcohol)-thickeners. Among them, poly(acrylic acid) thickeners and urethane thickeners are preferred.

The amount (solids content (non-volatile content)) of the thickener is typically 0 to 10 parts by weight per 100 parts by weight (solids content (non-volatile content)) of the resinous material (polymer). Of the amount, the lower limit is preferably 0.1 part by weight; and the upper limit is preferably 5 parts by weight.

The foam may include any rust inhibitor so as to eliminate or minimize corrosion of a metal member adjacent to the foamed sheet. The rust inhibitor is preferably selected from azole-ring-containing compounds. The azole-ring-containing compounds, when used as the rust inhibitor, contribute to highly eliminated or minimized corrosion of the metal and to high adherend adhesion.

The azole-ring-containing compounds have only to be compounds containing a five-membered ring including one or more nitrogen atoms in the ring and are exemplified by, but are not limited to, compounds each containing a ring selected from diazole (imidazole, pyrazole), triazole, tetrazole, oxazole, isoxazole, thiazole, and isothiazole rings. These rings may each be condensed with an aromatic ring (e.g., benzene ring) to form a fused ring. Examples of the compounds containing such a fused ring include, but are not limited to, compounds containing a fused ring selected from benzimidazole, benzopyrazole, benzotriazole, benzoxazole, benzoisoxazole, benzothiazole, and benzisothiazole rings.

The azole rings and the fused rings (e.g., benzotriazole ring and benzothiazole ring) may each have one or more substituents. Examples of the substituents include, but are not limited to, $C_1$-$C_6$ alkyl groups such as methyl, ethyl, propyl, isopropyl, and butyl groups, of which $C_1$-$C_3$ alkyl groups are preferred; $C_1$-$C_{12}$ alkoxy groups such as methoxy, ethoxy, isopropyloxy, and butoxy groups, of which $C_1$-$C_3$ alkoxy groups are preferred; $C_6$-$C_{10}$ aryl groups such as phenyl, tolyl, and naphthyl groups; amino group; mono- or di-($C_1$-$C_{10}$ alkyl)-amino groups such as methylamino and dimethylamino groups; amino-$C_1$-$C_6$ alkyl groups such as aminomethyl and 2-aminoethyl groups; mono- or di-($C_1$-$C_{10}$ alkyl)amino-$C_1$-$C_6$ alkyl groups such as N,N-diethylaminomethyl and N,N-bis(2-ethylhexyl)aminomethyl groups; mercapto group; ($C_1$-$C_6$ alkoxy)-carbonyl groups such as methoxycarbonyl and ethoxycarbonyl groups; carboxy group; carboxy-$C_1$-$C_6$ alkyl groups such as carboxymethyl group; carboxy-$C_1$-$C_6$ alkylthio groups such as 2-carboxyethylthio group; N,N-bis(hydroxy-$C_1$-$C_4$ alkyl)amino-$C_1$-$C_4$ alkyl groups such as N,N-bis(hydroxymethyl)aminomethyl group; and sulfo group. The azole-ring-containing compounds may each form salts such as sodium salts and potassium salts.

Of the azole-ring-containing compounds, compounds containing a fused ring formed by the azole ring condensed with an aromatic ring (e.g., benzene ring) are preferred, of which benzotriazole compounds (compounds containing a benzotriazole ring) and benzothiazole compounds (compounds containing a benzothiazole ring) are particularly preferred. These are preferred from the point of anticorrosive action on metals.

Examples of the benzotriazole compounds include, but are not limited to, 1,2,3-benzotriazole, methylbenzotriazoles, carboxybenzotriazoles, carboxymethylbenzotriazoles, 1-[N,N-bis(2-ethylhexyl)aminomethyl]benzotriazole, 1-[N,N-bis(2-ethylhexyl)aminomethyl]methylbenzotriazole, 2,2'-[[(methyl-1H-benzotriazol-1-yl)methyl]imino]bisethanol, and sodium salts of them.

Non-limiting of the benzothiazole compounds include 2-mercaptobenzothiazole, 3-(2-(benzothiazolyl)thio)propionic acid, and sodium salts of them.

Each of different azole-ring-containing compounds may be used alone or in combination.

The amount (solids content (non-volatile content)) of the rust inhibitor(s) (e.g., the azole-ring-containing compound (s)) (solids content (non-volatile content)) has only to fall within a range not adversely affecting adhesion to the adherend and inherent properties of the foam and is typically 0.2 to 5 parts by weight per 100 parts by weight (solids content (non-volatile content)) of the resinous material (polymer). Of the amount, the lower limit is more preferably 0.3 part by weight, and furthermore preferably 0.4 part by weight; and the upper limit is more preferably 3 parts by weight, and furthermore preferably 2 parts by weight.

The foam may further include any other appropriate components within ranges not adversely affecting impact absorption. The foam may include each of different other components alone or in combination. Examples of the other components include, but are not limited to, polymer components excluding those mentioned above, softeners, antioxidants, age inhibitors, gelling agents, curing agents, plasticizers, fillers, reinforcers, blowing agents (e.g., sodium hydrogencarbonate), microcapsules (e.g., thermally expandable microspheres), flame retardants, photostabilizers, ultraviolet absorbers, colorants (e.g., pigments and dyestuffs), pH adjusters, solvents (organic solvents), thermal initiators, and photoinitiators. The amounts (solids content (non-volatile content)) of these components are not limited, as long as falling within ranges not adversely affecting adhesion to the adherend and inherent properties of the foam, and are each typically from 0.2 to 60 parts by weight per 100 parts by weight (solids content (non-volatile content)) of the resinous material (polymer). The amount (solids content (non-volatile content)) of the blowing agents (e.g., sodium hydrogencarbonate) is more preferably 0.5 to 20 parts by weight per 100 parts by weight (solids content (non-volatile content)) of the resinous material (polymer). The amount (solids content (non-volatile content)) of the microcapsules (e.g., thermally expandable microspheres) is more preferably 0.2 to 10 parts by weight per 100 parts by weight (solids content (non-volatile content)) of the resinous material (polymer). The amount (solids content (non-volatile content)) of the fillers is more preferably 0.3 to 50 parts by weight per 100 parts by weight (solids content (non-volatile content)) of the resinous material (polymer).

Non-limiting examples of the fillers include silica, clays (e.g., mica, talc, and smectite), alumina, titania, zinc oxide, tin oxide, zeolite, graphite, carbon nanotubes, inorganic fibers (e.g., carbon fibers and glass fibers), organic fibers, and powders of metals (e.g., silver and copper). Non-limiting examples of the fillers also include piezoelectric particles such as titanium oxides and barium titanate; electroconductive particles such as electroconductive titanium oxides and tin oxide; thermally conductive particles such as boron nitride; and organic fillers such as silicone powders. The amount of clays (e.g., mica) upon use as the fillers is particularly preferably from 0.3 to 10 parts by weight per 100 parts by weight (solids content (non-volatile content)) of the resinous material (polymer). The amount of the piezoelectric particles upon use as the fillers is particularly preferably from 5 to 40 parts by weight per 100 parts by weight (solids content (non-volatile content)) of the resinous material (polymer). The amount of the electroconductive particles upon use as the fillers is particularly preferably from 5 to 40 parts by weight per 100 parts by weight (solids content (non-volatile content)) of the resinous material (polymer). Assume that the piezoelectric particles and the electroconductive particles are used in combination as the fillers. With the combination use, the electric charge generation amount is adjustable by the pressure. In this case, the ratio (by weight) of the piezoelectric particles to the electroconductive particles is typically from 10:90 to 90:10, preferably from 20:80 to 80:20, and more preferably from 30:70 to 70:30.

The foamed sheet according to the present invention may be produced by subjecting a resin composition to expansion molding, where the resin composition includes a resinous material (polymer) to constitute the foam. The expansion technique (foam-forming technique) for use herein may be selected from techniques generally used in expansion molding, such as physical techniques and chemical techniques. In general, physical techniques disperse a gaseous component such as air or nitrogen gas in a polymer solution and mechanically mix them to form foams (cells). The chemical techniques add a blowing agent to a polymer base, thermally decompose the blowing agent to give a gas to thereby form cells, and form a foam. Among them, physical techniques are preferred from the viewpoints typically of environmental issues. Cells formed by the physical techniques are often open cells.

The resin composition including the resinous material (polymer) to be subjected to expansion molding may be a resin solution of the resinous material in a solvent, but is preferably an emulsion including the resinous material. This is preferred from the viewpoint of foaming properties. The emulsion may be a blend of two or more different emulsions.

The emulsion preferably has a high solids concentration from the viewpoint of film-formability. The emulsion has a solids concentration of preferably 30% by weight or more, more preferably 40% by weight or more, and furthermore preferably 50% by weight or more.

The foam in the present invention is preferably prepared by a method for preparing a foam via a step (step A) of mechanically foaming the emulsion resin composition. Examples of a foaming device include, but are not limited to, devices typically of high-speed shearing system, vibrating system, or pressurized gas discharging system. Among them, devices of high-speed shearing system are preferred for smaller cell diameter and for preparation of a large-volume foam.

The foams (cells) formed via mechanical stirring include a gas incorporated in the emulsion. The gas is not limited, as long as being inert to the emulsion, and is exemplified by air, nitrogen, and carbon dioxide. Among them, air is preferred from the viewpoint of economic efficiency.

The foamed sheet according to the present invention may be obtained via a step (step B) of applying the expanded emulsion resin composition expanded in the above manner onto a substrate and drying the applied composition. Examples of the substrate include, but are not limited to, release-treated plastic films such as release-treated poly(ethylene terephthalate) films; plastic films such as poly(ethylene terephthalate) films; and thermally-conductive layers (after-mentioned thermally-conductive layers). Assume that such a thermally-conductive layer is used as the substrate on which the expanded emulsion resin composition is to be applied. In this case, the resulting foam layer has better adhesion to the thermally-conductive layer, and the drying step to prepare the foam layer is performed more efficiently.

The application (coating) and the drying in the step B may be performed by common techniques. The step B preferably includes a preliminary drying step B1 and a drying step B2. In the preliminary drying step B1, the bubble-containing (foamed) emulsion resin composition applied on the substrate is dried at a temperature of from 50° C. to lower than 125° C. In the drying step B2, the preliminarily dried composition is further dried at a temperature of from 125° C. to 200° C.

Providing of the preliminary drying step B1 and the drying step B2 eliminates or minimizes coalescence and rupture of the foams due to abrupt temperature rise. In particular, a foamed sheet having a small thickness may undergo coalescence and/or rupture of cells due to the abrupt temperature rise. The providing of the preliminary drying step B1 is of great significance particularly in this case. The temperature in the preliminary drying step B1 is preferably from 50° C. to 100° C. The preliminary drying step B1 is performed for a time (duration) of typically 0.5 minute to 30 minutes, and preferably 1 minute to 15 minutes. The temperature in the drying step B2 is preferably from 130° C. to 180° C. and more preferably from 130° C. to 160° C. The drying step B2 is performed for a time (duration) of typically 0.5 minute to 30 minutes, and preferably 1 minute to 15 minutes.

The average cell diameter, maximum cell diameter, and minimum cell diameter of the foam may be controlled by adjusting the type and amount of the surfactant and/or by adjusting the stirring rate and stirring time upon mechanical stirring so as to allow the resulting foamed sheet to have an average cell diameter of from 10 to 150 μm.

The amount of the gaseous component to be incorporated into the emulsion resin composition upon mechanical stirring may be adjusted so as to allow the resulting foam to have a density of 0.2 to 0.7 g/cm$^3$.

The foamed sheet according to the present invention may include a pressure-sensitive adhesive layer (tacky adhesive layer) on or above one or both sides of the foam. A pressure-sensitive adhesive constituting the pressure-sensitive adhesive layer is not limited and may be selected typically from acrylic-, rubber-, and silicone-pressure-sensitive adhesives. The pressure-sensitive adhesive layer, when provided, may bear a release liner on it surface to protect the pressure-sensitive adhesive layer before use. The foamed sheet according to the present invention, when including a foam having slight tackiness, is capable of securing a member or any other article without providing the pressure-sensitive adhesive layer.

In an embodiment, the foam constituting the foamed sheet according to the present invention has a shear bond strength of 0.5 N/100 mm$^2$ or more in at least one side thereof to a SUS 304BA plate, where the shear bond strength is measured at 23° C. and at a tensile speed of 50 mm/min. This configuration advantageously allows the foamed sheet, when laminated with another member (e.g., the thermally-conductive layer), to resist separation of the other member, and to eliminate or minimize the misregistration even when including no adhesive layer. The configuration does not require providing of an adhesive layer and reduces the thickness of the laminate of the foamed sheet with the other member and contributes to further reduced thickness of an electrical/electronic device or another target article to which the laminate is installed. In addition, the configuration allows the laminate to be produced with better production efficiency at lower cost. Non-limiting examples of the layer configuration of the laminate of the foamed sheet according to the present invention with the other member (e.g., the thermally-conductive layer) include other member/foam; other member/pressure-sensitive adhesive layer/foam; foam/other member/foam; and foam/pressure-sensitive adhesive layer/other member/pressure-sensitive adhesive layer/foam.

The shear bond strength of the foam to a SUS 304BA plate may be adjusted typically by selecting the type(s) and compositional proportion(s) of the monomer(s) to form the resinous material (polymer) constituting the foam. For example, the foam may be allowed to have a shear bond strength of 0.5 N/100 mm$^2$ or more to the SUS 304BA plate by using, as a monomer to form the resinous material (polymer such as an acrylic polymer) constituting the foam, a monomer having a homopolymer Tg of lower than −10° C. in an amount of typically from 70% to 98% by weight of all the monomer components (total amount of monomer components) to form the resinous material (polymer such as an acrylic polymer) constituting the foam; and by appropriately selecting the type(s) and amount(s) of other monomer(s). The homopolymer Tg is typically from −70° C. to lower than −10° C., preferably from −70° C. to −12° C., and furthermore preferably from −65° C. to −15° C. Of the amount of the monomer, the lower limit is preferably 75% by weight; and the upper limit is preferably 97% by weight.

The lower limit of the shear bond strength of the foam to the SUS 304BA plate is preferably 0.5 N/100 mm$^2$, and furthermore preferably 0.7 N/100 mm$^2$. The upper limit of the shear bond strength of the foam to the SUS 304BA plate is not limited, but is typically 100 N/100 mm$^2$.

The foamed sheet according to the present invention may be wound into a roll to give a rolled product before distribution on the market.

The foamed sheet according to the present invention has excellent impact absorption even though having a small thickness. Owing to this, the foamed sheet is useful as electrical/electronic device members, in particular as shock absorbing sheets, which are used in installing (mounting) of various members or components (e.g., optical members) to predetermined regions (e.g., cabinets) in electrical/electronic devices.

Examples of the optical members that can be installed (mounted) using the foamed sheet according to the present invention include, but are not limited to, image display members (in particular, small-sized image display members) to be mounted to image display devices such as liquid crystal displays, electroluminescence displays, and plasma displays; and touch screens and other display members, as well as cameras and lenses (in particular, small-sized cameras and lenses) to be mounted to mobile communication devices such as so-called "cellular phones", "smartphones", and "personal digital assistants".

The electrical/electronic device according to the present invention includes the foamed sheet according to the present invention. Such electrical/electronic devices according to the present invention include an electrical/electronic device that includes a display member, a cabinet, and the foamed sheet, in which structure the foamed sheet is disposed and held between the cabinet and the display member. Non-limiting examples of the electrical/electronic device just mentioned above include mobile communication devices such as so-called "cellular phones", "smartphones", and "personal digital assistants".

EXAMPLES

The present invention will be illustrated in further detail with reference to several examples below. It should be noted, however, that the examples are by no means intended to limit the scope of the present invention. All percentages indicating contents are by weight, unless otherwise specified. All loadings (part by weight) are values in terms of solids content (non-volatile content).

Example 1

Materials used were 100 parts by weight of an acrylic emulsion solution (solids content: 55%, an ethyl acrylate-butyl acrylate-acrylonitrile copolymer having weight proportions of 45:48:7); 3 parts by weight of an ammonium fatty acid salt surfactant (an aqueous dispersion of ammonium stearate, solids content: 33%) (surfactant A); and 0.78 part by weight of a poly(acrylic acid) thickener (an ethyl acrylate-acrylic acid copolymer including 20% by weight of acrylic-acid-derived units, solids content: 28.7%). The materials were stirred and mixed using a disper (ROBOMIX, supplied by PRIMIX Corporation) to form foams. Separately, a release-treated poly(ethylene terephthalate) (PET) film (thickness: 38 μm, trade name MRF #38, supplied by Mitsubishi Plastics, Inc.) was prepared. The foamed composition was applied onto the release-treated PET film, dried at 70° C. for 4.5 minutes and at 140° C. for 4.5 minutes, and yielded a foam (foamed sheet) having an open-cell structure. This had a thickness of 150 μm, a density of 0.31 g/cm$^3$, and an average cell diameter of 57 μm.

Example 2

Materials used were 100 parts by weight of an acrylic emulsion solution (solids content: 55%, an ethyl acrylate-butyl acrylate-acrylonitrile copolymer having weight proportions of 45:48:7); 3 parts by weight of an ammonium fatty acid salt surfactant (an aqueous dispersion of ammonium stearate, solids content: 33%); 3.6 parts by weight of an epoxy crosslinker (sorbitol polyglycidyl ether); and 0.78 part by weight of a poly(acrylic acid) thickener (an ethyl acrylate-acrylic acid copolymer including 20% by weight of acrylic-acid-derived units, solids content: 28.7%). The materials were stirred and mixed using a disper (ROBOMIX, supplied by PRIMIX Corporation) to form foams. Separately, a release-treated PET film (thickness: 38 μm, trade name MRF #38, supplied by Mitsubishi Plastics, Inc.) was prepared. The foamed composition was applied onto the release-treated PET film, dried at 70° C. for 4.5 minutes and at 140° C. for 4.5 minutes, and yielded a foam (foamed sheet) having an open-cell structure. This had a thickness of 150 μm, a density of 0.33 g/cm$^3$, and an average cell diameter of 60 μm.

Example 3

Materials used were 100 parts by weight of an acrylic emulsion solution (solids content: 55%, an ethyl acrylate-butyl acrylate-acrylonitrile copolymer having weight proportions of 45:48:7); 3 parts by weight of an ammonium fatty acid salt surfactant (an aqueous dispersion of ammonium stearate, solids content: 33%); 7.2 parts by weight of an epoxy crosslinker (sorbitol polyglycidyl ether); and 0.78 part by weight of a poly(acrylic acid) thickener (an ethyl acrylate-acrylic acid copolymer including 20% by weight of acrylic-acid-derived units, solids content: 28.7%). The materials were stirred and mixed using a disper (ROBOMIX, supplied by PRIMIX Corporation) to form foams. Separately, a release-treated PET film (thickness: 38 μm, trade name MRF #38, supplied by Mitsubishi Plastics, Inc.) was prepared. The foamed composition was applied onto the release-treated PET film, dried at 70° C. for 4.5 minutes and at 140° C. for 4.5 minutes, and yielded a foam (foamed sheet) having an open-cell structure. This had a thickness of 150 μm, a density of 0.35 g/cm$^3$, and an average cell diameter of 61 μm.

Example 4

Materials used were 100 parts by weight of an acrylic emulsion solution (solids content: 55%, an ethyl acrylate-butyl acrylate-acrylonitrile copolymer having weight proportions of 45:48:7); 3 parts by weight of an ammonium fatty acid salt surfactant (an aqueous dispersion of ammonium stearate, solids content: 33%); 1.8 parts by weight of an epoxy crosslinker (TETRAD C, supplied by MITSUBISHI GAS CHEMICAL COMPANY, INC.); and 0.78 part by weight of a poly(acrylic acid) thickener (an ethyl acrylate-acrylic acid copolymer including 20% by weight of acrylic-acid-derived units, solids content: 28.7%). The materials were stirred and mixed using a disper (ROBOMIX, supplied by PRIMIX Corporation) to form foams. Separately, a release-treated PET film (thickness: 38 μm, trade name MRF #38, supplied by Mitsubishi Plastics, Inc.) was prepared. The foamed composition was applied onto the release-treated PET film, dried at 70° C. for 4.5 minutes and at 140° C. for 4.5 minutes, and yielded a foam (foamed sheet) having an open-cell structure. This had a thickness of 140 μm, a density of 0.35 g/cm$^3$, and an average cell diameter of 59 μm.

Example 5

Materials used were 100 parts by weight of an acrylic emulsion solution (solids content: 55%, an ethyl acrylate-butyl acrylate-acrylonitrile copolymer having weight proportions of 45:48:7); 3 parts by weight of an ammonium fatty acid salt surfactant (an aqueous dispersion of ammonium stearate, solids content: 33%); 1.8 parts by weight of an oxazoline crosslinker (EPOCROS WS-700, supplied by Nippon Shokubai Co., Ltd., solids content: 24.9%); and 0.78 part by weight of a poly(acrylic acid) thickener (an ethyl acrylate-acrylic acid copolymer including 20% by weight of acrylic-acid-derived units, solids content: 28.7%). The materials were stirred and mixed using a disper (ROBOMIX, supplied by PRIMIX Corporation) to form foams. Separately, a release-treated PET film (thickness: 38 μm, trade name MRF #38, supplied by Mitsubishi Plastics, Inc.) was prepared. The foamed composition was applied onto the release-treated PET film, dried at 70° C. for 4.5 minutes and at 140° C. for 4.5 minutes, and yielded a foam (foamed sheet) having an open-cell structure. This had a thickness of 150 μm, a density of 0.33 g/cm$^3$, and an average cell diameter of 87 μm.

Example 6

Materials used were 100 parts by weight of an acrylic emulsion solution (solids content: 55%, an ethyl acrylate-butyl acrylate-acrylonitrile copolymer having weight proportions of 45:48:7); 3 parts by weight of an ammonium fatty acid salt surfactant (an aqueous dispersion of ammonium stearate, solids content: 33%); 3.6 parts by weight of an epoxy crosslinker (sorbitol polyglycidyl ether); and 1.3 parts by weight of a poly(acrylic acid) thickener (an ethyl acrylate-acrylic acid copolymer including 20% by weight of acrylic-acid-derived units, solids content: 28.7%). The materials were stirred and mixed using a disper (ROBOMIX, supplied by PRIMIX Corporation) to form foams. Separately, a release-treated PET film (thickness: 38 μm, trade name MRF #38, supplied by Mitsubishi Plastics, Inc.) was prepared. The foamed composition was applied onto the release-treated PET film, dried at 70° C. for 4.5 minutes and at 140° C. for 4.5 minutes, and yielded a foam (foamed sheet) having an open-cell structure. This had a thickness of 150 μm, a density of 0.34 g/cm$^3$, and an average cell diameter of 77 μm.

Example 7

Materials used were 100 parts by weight of an acrylic emulsion solution (solids content: 55%, an ethyl acrylate-butyl acrylate-acrylonitrile copolymer having weight proportions of 45:48:7); 3 parts by weight of an ammonium fatty acid salt surfactant (an aqueous dispersion of ammonium stearate, solids content: 33%); 3.6 parts by weight of an epoxy crosslinker (sorbitol polyglycidyl ether); and 4.55 parts by weight of a urethane thickener (Hydran Assister T10, supplied by DIC Corporation, solids content: 25.1%). The materials were stirred and mixed using a disper (ROBOMIX, supplied by PRIMIX Corporation) to form foams. Separately, a release-treated PET film (thickness: 38 µm, trade name MRF #38, supplied by Mitsubishi Plastics, Inc.) was prepared. The foamed composition was applied onto the release-treated PET film, dried at 70° C. for 4.5 minutes and at 140° C. for 4.5 minutes, and yielded a foam (foamed sheet) having an open-cell structure. This had a thickness of 160 µm, a density of 0.36 g/cm$^3$, and an average cell diameter of 80 µm.

Example 8

Materials used were 100 parts by weight of an acrylic emulsion solution (LX852B, supplied by ZEON CORPORATION, solids content: 45%; 3.7 parts by weight of an ammonium fatty acid salt surfactant (an aqueous dispersion of ammonium stearate, solids content: 33%); and 0.64 part by weight of a poly(acrylic acid) thickener (an ethyl acrylate-acrylic acid copolymer including 20% by weight of acrylic-acid-derived units, solids content: 28.7%). The materials were stirred and mixed using a disper (ROBOMIX, supplied by PRIMIX Corporation) to form foams. Separately, a release-treated PET film (thickness: 38 µm, trade name MRF #38, supplied by Mitsubishi Plastics, Inc.) was prepared. The foamed composition was applied onto the release-treated PET film, dried at 70° C. for 4.5 minutes and at 140° C. for 4.5 minutes, and yielded a foam (foamed sheet) having an open-cell structure. This had a thickness of 150 µm, a density of 0.37 g/cm$^3$, and an average cell diameter of 43 µm.

Example 9

Materials used were 100 parts by weight of an acrylic emulsion solution (LX851C, supplied by ZEON CORPORATION, solids content: 45%); 3 parts by weight of an ammonium fatty acid salt surfactant (an aqueous dispersion of ammonium stearate, solids content: 33%); and 1.15 parts by weight of a poly(acrylic acid) thickener (an ethyl acrylate-acrylic acid copolymer including 20% by weight of acrylic-acid-derived units, solids content: 28.7%). The materials were stirred and mixed using a disper (ROBOMIX, supplied by PRIMIX Corporation) to form foams. Separately, a release-treated PET film (thickness: 38 µm, trade name MRF #38, supplied by Mitsubishi Plastics, Inc.) was prepared. The foamed composition was applied onto the release-treated PET film, dried at 70° C. for 4.5 minutes and at 140° C. for 4.5 minutes, and yielded a foam (foamed sheet) having an open-cell structure. This had a thickness of 170 µm, a density of 0.29 g/cm$^3$, and an average cell diameter of 58 µm.

Example 10

Materials used were 100 parts by weight of a synthetic rubber emulsion (Lacstar 1570, supplied by DIC Corporation, solids content: 42.4%, NBR); 3.9 parts by weight of an ammonium fatty acid salt surfactant (an aqueous dispersion of ammonium stearate, solids content: 33%); and 0.74 part by weight of a urethane thickener (Hydran Assister T10, supplied by DIC Corporation, solids content: 25.1%). The materials were stirred and mixed using a disper (ROBOMIX, supplied by PRIMIX Corporation) to form foams. Separately, a release-treated PET film (thickness: 38 µm, trade name MRF #38, supplied by Mitsubishi Plastics, Inc.) was prepared. The foamed composition was applied onto the release-treated PET film, dried at 70° C. for 4.5 minutes and at 140° C. for 4.5 minutes, and yielded a foam (foamed sheet) having an open-cell structure. This had a thickness of 150 µm, a density of 0.26 g/cm$^3$, and an average cell diameter of 55 µm.

Example 11

Materials used were 100 parts by weight of a synthetic rubber emulsion (Lacstar DM886, supplied by DIC Corporation, solids content: 48.6%, MBR); 3.4 parts by weight of an ammonium fatty acid salt surfactant (an aqueous dispersion of ammonium stearate, solids content: 33%); and 0.65 part by weight of a urethane thickener (Hydran Assister T10, supplied by DIC Corporation, solids content: 25.1%). The materials were stirred and mixed using a disper (ROBOMIX, supplied by PRIMIX Corporation) to form foams. Separately, a release-treated PET film (thickness: 38 µm, trade name MRF #38, supplied by Mitsubishi Plastics, Inc.) was prepared. The foamed composition was applied onto the release-treated PET film, dried at 70° C. for 4.5 minutes and at 140° C. for 4.5 minutes, and yielded a foam (foamed sheet) having an open-cell structure. This had a thickness of 150 µm, a density of 0.28 g/cm$^3$, and an average cell diameter of 88 µm.

Example 12

Materials used were 100 parts by weight of a urethane emulsion (SUPERFLEX E-2000, supplied by Dai-ichi Kogyo Seiyaku Co., Ltd., solids content: 50.5%, a polyester polyurethane); 3 parts by weight of an ammonium fatty acid salt surfactant (an aqueous dispersion of ammonium stearate, solids content: 33%); and 0.93 part by weight of a urethane thickener (Hydran Assister T10, supplied by DIC Corporation, solids content: 25.1%). The materials were stirred and mixed using a disper (ROBOMIX, supplied by PRIMIX Corporation) to form foams. Separately, a release-treated PET film (thickness: 38 µm, trade name MRF #38, supplied by Mitsubishi Plastics, Inc.) was prepared. The foamed composition was applied onto the release-treated PET film, dried at 70° C. for 4.5 minutes and at 140° C. for 4.5 minutes, and yielded a foam (foamed sheet) having an open-cell structure. This had a thickness of 140 µm, a density of 0.42 g/cm$^3$, and an average cell diameter of 87 µm.

Example 13

Materials used were 100 parts by weight of an ethylene-vinyl acetate copolymer emulsion (Sumikaflex 408HQE, supplied by Sumika Chemtex Company, Limited, solids content: 50%); 3.3 parts by weight of an ammonium fatty acid salt surfactant (an aqueous dispersion of ammonium stearate, solids content: 33%); and 1.66 parts by weight of a poly(acrylic acid) thickener (an ethyl acrylate-acrylic acid copolymer including 20% by weight of acrylic-acid-derived units, solids content: 28.7%). The materials were stirred and mixed using a disper (ROBOMIX, supplied by PRIMIX Corporation) to form foams. Separately, a release-treated PET film (thickness: 38 μm, trade name MRF #38, supplied by Mitsubishi Plastics, Inc.) was prepared. The foamed composition was applied onto the release-treated PET film, dried at 70° C. for 4.5 minutes and at 140° C. for 4.5 minutes, and yielded a foam (foamed sheet) having an open-cell structure. This had a thickness of 140 μm, a density of 0.48 g/cm$^3$, and an average cell diameter of 140 μm.

Example 14

Materials used were 100 parts by weight of an acrylic emulsion solution (solids content: 55%, an ethyl acrylate-butyl acrylate-acrylonitrile copolymer having weight proportions of 45:48:7); 3 parts by weight of an ammonium fatty acid salt surfactant (an aqueous dispersion of ammonium stearate, solids content: 33%); and 1.3 parts by weight of a poly(acrylic acid) thickener (an ethyl acrylate-acrylic acid copolymer including 20% by weight of acrylic-acid-derived units, solids content: 28.7%). The materials were stirred and mixed using a disper (ROBOMIX, supplied by PRIMIX Corporation) to form foams. Separately, a release-treated PET film (thickness: 38 μm, trade name MRF #38, supplied by Mitsubishi Plastics, Inc.) was prepared. The foamed composition was applied onto the release-treated PET film, dried at 70° C. for 4.5 minutes and at 140° C. for 4.5 minutes, and yielded a foam (foamed sheet) having an open-cell structure. This had a thickness of 60 μm, a density of 0.41 g/cm$^3$, and an average cell diameter of 89 μm.

Example 15

Materials used were 100 parts by weight of an acrylic emulsion solution (solids content: 55%, an ethyl acrylate-butyl acrylate-acrylonitrile copolymer having weight proportions of 45:48:7); 3 parts by weight of an ammonium fatty acid salt surfactant (an aqueous dispersion of ammonium stearate, solids content: 33%); and 1.3 parts by weight of a poly(acrylic acid) thickener (an ethyl acrylate-acrylic acid copolymer including 20% by weight of acrylic-acid-derived units, solids content: 28.7%). The materials were stirred and mixed using a disper (ROBOMIX, supplied by PRIMIX Corporation) to form foams. Separately, a release-treated PET film (thickness: 38 μm, trade name MRF #38, supplied by Mitsubishi Plastics, Inc.) was prepared. The foamed composition was applied onto the release-treated PET film, dried at 70° C. for 4.5 minutes and at 140° C. for 4.5 minutes, and yielded a foam (foamed sheet) having an open-cell structure. This had a thickness of 100 μm, a density of 0.39 g/cm$^3$, and an average cell diameter of 65 μm.

Example 16

Materials used were 100 parts by weight of an acrylic emulsion solution (solids content: 55%, an ethyl acrylate-butyl acrylate-acrylonitrile copolymer having weight proportions of 45:48:7); 3 parts by weight of an ammonium fatty acid salt surfactant (an aqueous dispersion of ammonium stearate, solids content: 33%); and 1.3 parts by weight of a poly(acrylic acid) thickener (an ethyl acrylate-acrylic acid copolymer including 20% by weight of acrylic-acid-derived units, solids content: 28.7%). The materials were stirred and mixed using a disper (ROBOMIX, supplied by PRIMIX Corporation) to form foams. Separately, a release-treated PET film (thickness: 38 μm, trade name MRF #38, supplied by Mitsubishi Plastics, Inc.) was prepared. The foamed composition was applied onto the release-treated PET film, dried at 70° C. for 4.5 minutes and at 140° C. for 4.5 minutes, and yielded a foam (foamed sheet) having an open-cell structure. This had a thickness of 130 μm, a density of 0.38 g/cm$^3$, and an average cell diameter of 68 μm.

Example 17

Materials used were 100 parts by weight of an acrylic emulsion solution (solids content: 55%, an ethyl acrylate-butyl acrylate-acrylonitrile copolymer having weight proportions of 45:48:7); 3 parts by weight of an ammonium fatty acid salt surfactant (an aqueous dispersion of ammonium stearate, solids content: 33%); and 0.78 part by weight of a poly(acrylic acid) thickener (an ethyl acrylate-acrylic acid copolymer including 20% by weight of acrylic-acid-derived units, solids content: 28.7%). The materials were stirred and mixed using a disper (ROBOMIX, supplied by PRIMIX Corporation) to form foams. Separately, a release-treated PET film (thickness: 38 μm, trade name MRF #38, supplied by Mitsubishi Plastics, Inc.) was prepared. The foamed composition was applied onto the release-treated PET film, dried at 70° C. for 4.5 minutes and at 140° C. for 4.5 minutes, and yielded a foam (foamed sheet) having an open-cell structure. This had a thickness of 130 μm, a density of 0.62 g/cm$^3$, and an average cell diameter of 58 μm.

Comparative Example 1

Materials used were 100 parts by weight of an acrylic emulsion solution (solids content: 60%, an ethyl acrylate-acrylonitrile copolymer having weight proportions of 95:5); and 2.75 parts by weight of an ammonium fatty acid salt surfactant (an aqueous dispersion of ammonium stearate, solids content: 33%). The materials were stirred and mixed using a disper (ROBOMIX, supplied by PRIMIX Corporation) to form foams. Separately, a release-treated PET film (thickness: 38 μm, trade name MRF #38, supplied by Mitsubishi Plastics, Inc.) was prepared. The foamed composition was applied onto the release-treated PET film, dried at 70° C. for 4.5 minutes and at 140° C. for 4.5 minutes, and yielded a foam (foamed sheet) having an open-cell structure. This had a thickness of 130 μm, a density of 0.71 g/cm$^3$, and an average cell diameter of 70 μm.

Comparative Example 2

Materials used were 100 parts by weight of an acrylic emulsion solution (solids content: 60%, a butyl acrylate-methyl methacrylate-acrylonitrile copolymer including 5% by weight of acrylonitrile-derived units); 2.75 parts by weight of an ammonium fatty acid salt surfactant (an aqueous dispersion of ammonium stearate, solids content: 33%); and 0.48 part by weight of a poly(acrylic acid) thickener (an ethyl acrylate-acrylic acid copolymer including 20% by weight of acrylic-acid-derived units, solids content: 28.7%). The materials were stirred and mixed using a disper (ROBOMIX, supplied by PRIMIX Corporation) to form foams. Separately, a release-treated PET film (thickness: 38 μm, trade name MRF #38, supplied by Mitsubishi Plastics, Inc.) was prepared. The foamed composition was applied onto the release-treated PET film, dried at 70° C. for 4.5 minutes and at 140° C. for 4.5 minutes, and yielded a foam (foamed sheet) having an open-cell structure. This had a thickness of 150 μm, a density of 0.45 g/cm³, and an average cell diameter of 69 μm.

Comparative Example 3

Materials used were 100 parts by weight of an acrylic emulsion solution (solids content: 60%, butyl acrylate-methyl methacrylate-acrylonitrile copolymer including 5% by weight of acrylonitrile-derived units); 2.75 parts by weight of an ammonium fatty acid salt surfactant (an aqueous dispersion of ammonium stearate, solids content: 33%); and 0.72 part by weight of a poly(acrylic acid) thickener (an ethyl acrylate-acrylic acid copolymer including 20% by weight of acrylic-acid-derived units, solids content: 28.7%). The materials were stirred and mixed using a disper (ROBOMIX, supplied by PRIMIX Corporation) to form foams. Separately, a release-treated PET film (thickness: 38 μm, trade name MRF #38, supplied by Mitsubishi Plastics, Inc.) was prepared. The foamed composition was applied onto the release-treated PET film, dried at 70° C. for 4.5 minutes and at 140° C. for 4.5 minutes, and yielded a foam (foamed sheet) having an open-cell structure. This had a thickness of 140 μm, a density of 0.38 g/cm³, and an average cell diameter of 75 μm.

Evaluations

The foams (foamed sheets) prepared in Examples 1 to 17 and Comparative Examples 1 to 3 were subjected to evaluations as follows. Results are shown in Tables 1 and 2. Table 1 presents loadings (part by weight; in terms of solids content (non-volatile content)) of the components used in the examples and the comparative examples. The symbol "Em" represents the emulsion.

Average Cell Diameter

The average cell diameter (μm) was determined by capturing enlarged images of cross-sections of foams using a low-vacuum scanning electron microscope (Hitachi High-Technologies Science Systems Scanning Electron Microscope Model S-3400N) and analyzing the images. About 10 to about 20 foams (cells) were analyzed.

Density

A sample foam (foamed sheet) was cut (blanked) using a cutting die having a size of 100 mm by 100 mm, and the dimensions of the cut sample were measured. The thickness of the cut sample was measured using a 1/100 dial gauge having a measuring terminal diameter (φ) of 20 mm. The volume of the foam was calculated based on these measurements.

Next, the weight of the foam was measured using an even balance having a minimum scale of 0.01 g or smaller. Based on these values, the density (g/cm³) (apparent density) of the foam was calculated.

Dynamic Viscoelasticity

A sample foam was subjected to a temperature dispersion test using a visco-elastometer (rheometer) (ARES-2KFRTN1-FCO, supplied by TA Instruments Japan Inc.) in a film tensile measurement mode at an angular frequency of 1 rad/s. In the test, the temperature (° C.) and intensity (maximum) of a peak top of the loss tangent (tan δ) were measured, where the loss tangent (tan δ) is defined as the ratio of the loss modulus E" to the storage modulus E'.

In Table 2, the peak top temperature (° C.) of the loss tangent (tan δ) of the sample foam is presented in "Tangent delta temperature"; the peak top intensity (maximum) is presented in "Tangent delta maximum"; and a value determined by dividing the peak top intensity (maximum) by the foam density is presented in "Tangent delta maximum/density". This value corresponds to the peak top intensity (maximum) of the tan δ of materials (excluding foams (bubbles)) constituting the foam.

Initial Elastic Modulus

A sample foamed sheet was subjected to a tensile test at an ambient temperature of 23° C. and at a tensile speed of 300 mm/min to plot a curve, and the initial elastic modulus (N/mm²) was calculated from a slope of the curve at 10% strain and evaluated.

Impact Test

An impact test was performed using the pendulum impact tester (impact testing apparatus) (see FIGS. 1 and 2). Each of the foamed sheets prepared in the examples and comparative examples and having a size of 20 mm by 20 mm was used as a sample and subjected to the impact test under two different conditions, i.e., an low-impact condition and a high-impact condition. Under the low-impact condition, the test was performed using an iron ball of 28 g at a rise angle of 40°. Under the high-impact condition, the test was performed using an iron ball of 96 g at a rise angle of 47°. Impact absorption rates (%) were determined under the two conditions.

Next, each of the impact absorption rates (%) was divided by the foamed sheet thickness (μm) to give an impact absorption rate R per unit thickness.

As indicated in Table 2, the foamed sheets according to the examples had values R as specified above of 0.15 or more under the low-impact condition and of 0.10 or more under the high-impact condition and had excellent impact absorption regardless of the magnitudes of the impacts. In contrast, the foamed sheets according to the comparative examples did not meet the two requirements concurrently.

TABLE 1

| | | Em Loading (part) | Surfactant A Loading (part) | Surfactant B Loading (part) | Crosslinker Loading (part) | Thickener Loading (part) | Rust inhibitor Loading (part) | Pigment Loading (part) | Other component Loading (part) |
|---|---|---|---|---|---|---|---|---|---|
| Examples | 1 | 100 | 3 | — | — | 0.78 | — | — | — |
| | 2 | 100 | 3 | — | 3.6 | 0.78 | — | — | — |
| | 3 | 100 | 3 | — | 7.2 | 0.78 | — | — | — |
| | 4 | 100 | 3 | — | 1.8 | 0.78 | — | — | — |
| | 5 | 100 | 3 | — | 1.8 | 0.78 | — | — | — |
| | 6 | 100 | 3 | — | 3.6 | 1.3 | — | — | — |
| | 7 | 100 | 3 | — | 3.6 | 4.55 | — | — | — |
| | 8 | 100 | 3.7 | — | — | 0.64 | — | — | — |
| | 9 | 100 | 3.7 | — | — | 1.15 | — | — | — |
| | 10 | 100 | 3.9 | — | — | 0.74 | — | — | — |
| | 11 | 100 | 3.4 | — | — | 0.65 | — | — | — |

TABLE 1-continued

|  |  | Em Loading (part) | Surfactant A Loading (part) | Surfactant B Loading (part) | Crosslinker Loading (part) | Thickener Loading (part) | Rust inhibitor Loading (part) | Pigment Loading (part) | Other component Loading (part) |
|---|---|---|---|---|---|---|---|---|---|
|  | 12 | 100 | 3.3 | — | — | 0.93 | — | — | — |
|  | 13 | 100 | 3.3 | — | — | 1.66 | — | — | — |
|  | 14 | 100 | 3 | — | — | 1.3 | — | — | — |
|  | 15 | 100 | 3 | — | — | 1.3 | — | — | — |
|  | 16 | 100 | 3 | — | — | 1.3 | — | — | — |
|  | 17 | 100 | 3 | — | — | 0.78 | — | — | — |
|  | 18 | 100 | 3 | — | 0.35 | 0.78 | — | — | — |
|  | 19 | 100 | 3 | — | 0.35 | 0.78 | — | — | — |
|  | 20 | 100 | 3.7 | — | — | 0.96 | — | — | — |
|  | 21 | 100 | 3 | — | 0.35 | 0.78 | — | — | — |
|  | 22 | 100 | 1.5 | 1 | 0.35 | 0.78 | 0.5 | — | — |
|  | 23 | 100 | 3 | — | 0.35 | 0.78 | 0.5 | — | — |
|  | 24 | 100 | 3 | — | 2 | 0.78 | 0.5 | — | — |
|  | 25 | 100 | 3 | — | — | 0.58 | — | — | — |
|  | 26 | 100 | 3 | — | 0.35 | 0.78 | 0.5 | — | — |
|  | 27 | 100 | 3 | — | 0.35 | 0.78 | 0.5 | — | — |
|  | 28 | 100 | 3 | — | 0.35 | 0.78 | 0.5 | 0.76 | 5 |
|  | 29 | 100 | 3 | — | 0.35 | 0.78 | 0.5 | 0.76 | 1 |
|  | 30 | 100 | 3 | — | 0.35 | 0.78 | 0.5 | 0.76 | 1 |
|  | 31 | 100 | 3 | — | 0.35 | 0.78 | 0.5 | 0.76 | 20 |
|  | 32 | 100 | 3 | — | 0.35 | 0.78 | 0.5 | 0.76 | 40 |
|  | 33 | 100 | 3 | — | 0.35 | 0.78 | — | — | — |
| Comparative | 1 | 100 | 2.75 | — | — | — | — | — | — |
| Examples | 2 | 100 | 2.75 | — | — | 0.48 | — | — | — |
|  | 3 | 100 | 2.75 | — | — | 0.72 | — | — | — |
|  | 4 | 100 | 2.75 | — | — | 0.48 | — | — | — |

TABLE 2

|  |  | Thickness (μm) | Average cell diameter (μm) | Density (g/cm³) | Tangent delta temperature (° C.) | Tangent delta maximum (—) | Tangent delta maximum/density (g/cm³)⁻¹ | Initial elastic modulus (N/mm²) | Impact absorption rate (28-g iron ball at rise angle of 40°) | | Impact absorption rate (96-g iron ball at rise angle of 47°) | |
|---|---|---|---|---|---|---|---|---|---|---|---|---|
|  |  |  |  |  |  |  |  |  | (%) | Impact absorption rate (%)/thickness (μm) | (%) | Impact absorption rate (%)/thickness (μm) |
| Examples | 1 | 150 | 57 | 0.31 | 1.06 | 0.40 | 1.28 | 0.30 | 41.7 | 0.28 | 19.6 | 0.13 |
|  | 2 | 150 | 60 | 0.33 | −1.94 | 0.51 | 1.54 | 0.37 | 43.3 | 0.29 | 21.1 | 0.14 |
|  | 3 | 150 | 61 | 0.35 | 0.07 | 0.65 | 1.84 | 0.31 | 47.2 | 0.31 | 18.5 | 0.12 |
|  | 4 | 140 | 59 | 0.35 | 1.07 | 0.39 | 1.11 | 0.32 | 40.3 | 0.29 | 17.5 | 0.12 |
|  | 5 | 150 | 87 | 0.33 | −1.95 | 0.45 | 1.39 | 0.30 | 39.3 | 0.26 | 21.8 | 0.15 |
|  | 6 | 150 | 77 | 0.34 | 0.07 | 0.41 | 1.21 | 0.29 | 46.3 | 0.31 | 22.2 | 0.15 |
|  | 7 | 160 | 80 | 0.36 | −3.92 | 0.38 | 1.05 | 0.57 | 47.4 | 0.30 | 20.2 | 0.13 |
|  | 8 | 150 | 43 | 0.37 | 0.02 | 0.43 | 1.18 | 0.40 | 42.4 | 0.28 | 18.8 | 0.13 |
|  | 9 | 170 | 58 | 0.29 | 21.95 | 0.39 | 1.32 | 0.68 | 30.9 | 0.18 | 35.5 | 0.21 |
|  | 10 | 150 | 55 | 0.26 | −8.95 | 0.61 | 2.33 | 0.35 | 47.2 | 0.31 | 19.3 | 0.13 |
|  | 11 | 150 | 88 | 0.28 | −24.94 | 0.32 | 1.16 | 0.36 | 42.3 | 0.28 | 15.0 | 0.10 |
|  | 12 | 140 | 87 | 0.42 | −28.91 | 0.37 | 0.90 | 0.41 | 29.1 | 0.21 | 17.1 | 0.12 |
|  | 13 | 140 | 68 | 0.48 | −13.11 | 0.26 | 0.54 | 1.93 | 31.0 | 0.22 | 18.0 | 0.13 |
|  | 14 | 60 | 89 | 0.41 | 1.08 | 0.55 | 1.35 | 0.50 | 16.1 | 0.27 | 7.8 | 0.13 |
|  | 15 | 100 | 65 | 0.39 | 1.08 | 0.63 | 1.63 | 0.38 | 34.0 | 0.34 | 13.3 | 0.13 |
|  | 16 | 130 | 68 | 0.38 | 0.03 | 0.60 | 1.57 | 0.36 | 34.6 | 0.27 | 17.7 | 0.14 |
|  | 17 | 130 | 58 | 0.62 | −1.92 | 0.54 | 0.87 | 0.65 | 23.1 | 0.18 | 13.0 | 0.10 |
| Comparative | 1 | 130 | 70 | 0.71 | 13.99 | 0.41 | 0.58 | 0.46 | 11.3 | 0.09 | 10.1 | 0.08 |
| Examples | 2 | 150 | 69 | 0.45 | 35.83 | 0.44 | 0.98 | 6.45 | 7.2 | 0.05 | 15.8 | 0.11 |
|  | 3 | 140 | 75 | 0.38 | 40.08 | 0.51 | 1.34 | 16.51 | 7.3 | 0.05 | 15.5 | 0.11 |

Example 18

Materials used were 100 parts by weight of an acrylic emulsion solution (solids content: 55%, an ethyl acrylate-butyl acrylate-acrylonitrile copolymer having weight proportions of 45:48:7); 3 parts by weight of an ammonium fatty acid salt surfactant (an aqueous dispersion of ammonium stearate, solids content: 33%); 0.35 part by weight of an oxazoline crosslinker (EPOCROS WS-500, supplied by Nippon Shokubai Co., Ltd., solids content: 39%); and 0.78 part by weight of a poly(acrylic acid) thickener (an ethyl acrylate-acrylic acid copolymer including 20% by weight of acrylic-acid-derived units, solids content: 28.7%). The materials were stirred and mixed using a disper (ROBOMIX, supplied by PRIMIX Corporation) to form foams. Separately, a release-treated poly(ethylene terephthalate) (PET) film (thickness: 38 μm, trade name MRF #38, supplied by Mitsubishi Plastics, Inc.) was prepared. The foamed composition was applied onto the release-treated PET film, dried at 70° C. for 4.5 minutes and at 140° C. for 4.5 minutes, and yielded a foam (foamed sheet) having an open-cell structure. This had a thickness of 120 μm, a density of 0.31 g/cm³, and an average cell diameter of 57 μm.

Example 19

Materials used were 100 parts by weight of an acrylic emulsion solution (solids content: 55%, an ethyl acrylate-butyl acrylate-acrylonitrile copolymer having weight proportions of 45:48:7); 3 parts by weight of an ammonium fatty acid salt surfactant (an aqueous dispersion of ammonium stearate, solids content: 33%); 0.35 part by weight of an oxazoline crosslinker (EPOCROS WS-500, supplied by Nippon Shokubai Co., Ltd., solids content: 39%); and 0.78 part by weight of a poly(acrylic acid) thickener (an ethyl acrylate-acrylic acid copolymer including 20% by weight of acrylic-acid-derived units, solids content: 28.7%). The materials were stirred and mixed using a disper (ROBOMIX, supplied by PRIMIX Corporation) to form foams. Separately, a release-treated poly(ethylene terephthalate) (PET) film (thickness: 38 μm, trade name MRF #38, supplied by Mitsubishi Plastics, Inc.) was prepared. The foamed composition was applied onto the release-treated PET film, dried at 70° C. for 4.5 minutes and at 140° C. for 4.5 minutes, and yielded a foam (foamed sheet) having an open-cell structure. This had a thickness of 150 μm, a density of 0.31 g/cm³, and an average cell diameter of 57 μm.

Example 20

Materials used were 100 parts by weight of an acrylic emulsion solution (LX-852B, supplied by ZEON CORPORATION, solids content: 45%); 3.7 parts by weight of an ammonium fatty acid salt surfactant (an aqueous dispersion of ammonium stearate, solids content: 33%); and 0.96 part by weight of a poly(acrylic acid) thickener (an ethyl acrylate-acrylic acid copolymer including 20% by weight of acrylic-acid-derived units, solids content: 28.7%). The materials were stirred and mixed using a disper (ROBOMIX, supplied by PRIMIX Corporation) to form foams. Separately, a release-treated poly(ethylene terephthalate) (PET) film (thickness: 38 μm, trade name MRF #38, supplied by Mitsubishi Plastics, Inc.) was prepared. The foamed composition was applied onto the release-treated PET film, dried at 70° C. for 4.5 minutes and at 140° C. for 4.5 minutes, and yielded a foam (foamed sheet) having an open-cell structure. This had a thickness of 150 μm, a density of 0.37 g/cm³, and an average cell diameter of 43 μm.

Example 21

A foam having an open-cell structure was prepared by the procedure of Example 18. This had a thickness of 120 μm, a density of 0.31 g/cm³, and an average cell diameter of 57 μm. On one side of the sheet-like foam, an acrylic pressure-sensitive adhesive layer (a double-sided pressure-sensitive adhesive tape (trade name No. 5603, supplied by Nitto Denko Corporation), thickness: 30 μm) was arranged as a pressure-sensitive adhesive layer and yielded a foamed sheet.

Example 21A

A foam having an open-cell structure was prepared by the procedure of Example 18. This had a thickness of 120 μm, a density of 0.31 g/cm³, and an average cell diameter of 57 μm. On both sides of the sheet-like foam, an acrylic pressure-sensitive adhesive layer (a pressure-sensitive adhesive transfer tape (trade name GA5903, supplied by Nitto Denko Corporation), thickness: 30 μm) was disposed as a pressure-sensitive adhesive layer and yielded a foamed sheet.

Comparative Example 4

Materials used were 100 parts by weight of an acrylic emulsion solution (solids content: 60%, a methyl acrylate-methyl methacrylate-acrylonitrile copolymer including 5% by weight of acrylonitrile-derived units); 2.75 parts by weight of an ammonium fatty acid salt surfactant (an aqueous dispersion of ammonium stearate, solids content: 33%); and 0.48 part by weight of a poly(acrylic acid) thickener (an ethyl acrylate-acrylic acid copolymer including 20% by weight of acrylic-acid-derived units, solids content: 28.7%). The materials were stirred and mixed using a disper (ROBOMIX, supplied by PRIMIX Corporation) to form foams. Separately, a release-treated poly(ethylene terephthalate) (PET) film (thickness: 38 μm, trade name MRF #38, supplied by Mitsubishi Plastics, Inc.) was prepared. The foamed composition was applied onto the release-treated PET film, dried at 70° C. for 4.5 minutes and at 140° C. for 4.5 minutes, and yielded a foam (foamed sheet) having an open-cell structure. This had a thickness of 150 μm, a density of 0.45 g/cm³, and an average cell diameter of 69 μm.

Evaluations

The foamed sheets prepared in Examples 18 to 21 and 21A and Comparative Example 4 were subjected to evaluations as mentioned above, except for performing the impact test in the following manner. Specifically, 12-μm thick copper foil was laminated on one side (the side bearing the pressure-sensitive adhesive layer for Example 21) of a sample foamed sheet to give a test specimen (evaluation sample). The test specimen was subjected to an impact test using the pendulum impact tester (impact testing apparatus) (see FIGS. 1 and 2) under an impact condition with a 96-g iron ball at a rise angle of 30° to determine an impact absorption rate (%). Next, the impact absorption rate (%) was divided by the foamed sheet thickness (μm) to determine an impact absorption rate R3 per unit thickness. In the impact test, the test specimen was disposed so that the foamed sheet side of the test specimen faced the iron ball.

In addition, the foamed sheets prepared in Examples 18 to 21 and 21A and Comparative Example 4 were subjected to shear bond strength measurement in the following manner.

Shear Bond Strength

The foamed sheet according to Example 21 having a pressure-sensitive adhesive layer on one side of the foam was further provided with the pressure-sensitive adhesive layer on the other side. Each of this and the other foamed sheets was cut to a size of 25 mm by 25 mm, and, on both sides of which SUS 304BA plates were applied to give a measurement sample. The measurement sample was placed horizontally and was subjected to compression bonding by one reciprocating movement of a 5-kg roller thereon. After the compression bonding, the measurement sample was left stand at room temperature (23° C.) for 30 minutes, secured to the TENSILON so that the measurement sample was in an upright position, pulled at a tensile speed of 50 mm/min, and the shear bond strength during the pulling was measured. The measurement was performed with a number (n) of measurement samples of 2, and the average of two measurements was defined as a shear bond strength (N/100 mm²).

Evaluation results are presented in Table 3. For foamed sheets having a pressure-sensitive adhesive layer or layers, the thickness, average cell diameter, density, and tangent delta (tan δ) temperature in Table 3 were measured on foams before arrangement of the pressure-sensitive adhesive layer(s). Table 1 presents the loadings (part by weight) (in terms of solids content (non-volatile content) of the components in the examples and the comparative example.

As indicated in Table 3, the foamed sheets according to the examples had values R3 of 0.20 or more under the impact condition and offered excellent impact absorption. The foamed sheets maintained the laminate structure between the copper foil and the foam layer even after the impact test and offered good bonding reliability. In contrast, the foamed sheet according to the comparative example failed to be subjected to the impact test, because the foam layer thereof did not come in intimate contact with the copper foil, but separated immediately.

Example 23

Materials used were 100 parts by weight of an acrylic emulsion solution (solids content: 55%, an ethyl acrylate-butyl acrylate-acrylonitrile copolymer having weight proportions of 45:48:7); 3 parts by weight of an ammonium fatty acid salt surfactant (an aqueous dispersion of ammonium stearate, solids content: 33%); 0.35 part by weight of an oxazoline crosslinker (EPOCROS WS-500, supplied by Nippon Shokubai Co., Ltd., solids content: 39%); 0.78 part by weight of a poly(acrylic acid) thickener (an ethyl acrylate-acrylic acid copolymer including 20% by weight of acrylic-acid-derived units, solids content: 28.7%); and 0.5 part by weight of a benzotriazole rust inhibitor (SEETEC BT-NA, supplied by Shipro Kasei Kaisha, Ltd.). The materials were stirred and mixed using a disper (ROBOMIX, supplied by PRIMIX Corporation) to form foams. Separately, a release-treated poly(ethylene terephthalate) (PET) film (thickness: 38 μm, trade name MRF #38, supplied by Mitsubishi Plastics, Inc.) was prepared. The foamed composition was applied onto the release-treated PET film, dried at 70° C. for 4.5 minutes and at 140° C. for 4.5 minutes, and yielded a foam (foamed sheet) having an open-cell structure. This had a thickness of 130 μm, a density of 0.43 g/cm$^3$, a maximum cell diameter of 160 μm, a minimum cell diameter of 41 μm, and an average cell diameter of 101 μm.

TABLE 3

| | | Thickness (μm) | Average cell diameter (μm) | Density (g/cm$^3$) | Tangent delta temperature (° C.) | Shear bond strength (N/100 mm$^2$) | Pressure-sensitive adhesive layer thickness (μm) | Impact absorption rate (96-g iron ball, at rise angle of 30°) (%) | Impact absorption rate (%)/thickness (μm) |
|---|---|---|---|---|---|---|---|---|---|
| Examples | 18 | 120 | 57 | 0.31 | −1.95 | 14.00 | 0 | 27 | 0.23 |
| | 19 | 150 | 57 | 0.31 | −1.95 | 12.30 | 0 | 32 | 0.21 |
| | 20 | 150 | 43 | 0.37 | 0.02 | 11.70 | 0 | 32 | 0.21 |
| | 21 | 120 | 57 | 0.31 | −1.95 | 35.50 | 30 | 27 | 0.23 |
| | 21A | 120 | 57 | 0.31 | −1.95 | 30.40 | 60 (total of both sides) | 27 | 0.23 |
| Comparative Example | 4 | 150 | 69 | 0.45 | | 35.83 | 0.00 | 0 | unmeasurable |

Example 22

Materials used were 100 parts by weight of an acrylic emulsion solution (solids content: 55%, an ethyl acrylate-butyl acrylate-acrylonitrile copolymer having weight proportions of 45:48:7); 1.5 parts by weight of an ammonium fatty acid salt surfactant (an aqueous dispersion of ammonium stearate, solids content: 33%) (surfactant A); 1 part by weight of a carboxybetaine amphoteric surfactant (AMOGEN CB-H, supplied by Dai-ichi Kogyo Seiyaku Co., Ltd.) (surfactant B); 0.35 part by weight of an oxazoline crosslinker (EPOCROS WS-500, supplied by Nippon Shokubai Co., Ltd., solids content: 39%); 0.78 part by weight of a poly(acrylic acid) thickener (an ethyl acrylate-acrylic acid copolymer including 20% by weight of acrylic-acid-derived units, solids content: 28.7%); and 0.5 part by weight of a benzotriazole rust inhibitor (SEETEC BT-NA, supplied by Shipro Kasei Kaisha, Ltd.). The materials were stirred and mixed using a disper (ROBOMIX, supplied by PRIMIX Corporation) to form foams. Separately, a release-treated poly(ethylene terephthalate) (PET) film (thickness: 38 μm, trade name MRF #38, supplied by Mitsubishi Plastics, Inc.) was prepared. The foamed composition was applied onto the release-treated PET film, dried at 70° C. for 4.5 minutes and at 140° C. for 4.5 minutes, and yielded a foam (foamed sheet) having an open-cell structure. This had a thickness of 130 μm, a density of 0.33 g/cm$^3$, a maximum cell diameter of 110 μm, a minimum cell diameter of 20 μm, and an average cell diameter of 45 μm.

Example 24

Materials used were 100 parts by weight of an acrylic emulsion solution (solids content: 55%, an ethyl acrylate-butyl acrylate-acrylonitrile copolymer having weight proportions of 45:48:7); 3 parts by weight of an ammonium fatty acid salt surfactant (an aqueous dispersion of ammonium stearate, solids content: 33%); 2 parts by weight of an oxazoline crosslinker (EPOCROS WS-500, supplied by Nippon Shokubai Co., Ltd., solids content: 39%); 0.78 part by weight of a poly(acrylic acid) thickener (an ethyl acrylate-acrylic acid copolymer including 20% by weight of acrylic-acid-derived units, solids content: 28.7%); and 0.5 part by weight of a benzotriazole rust inhibitor (SEETEC BT-NA, supplied by Shipro Kasei Kaisha, Ltd.). The materials were stirred and mixed using a disper (ROBOMIX, supplied by PRIMIX Corporation) to form foams. Separately, a release-treated poly(ethylene terephthalate) (PET) film (thickness: 38 μm, trade name MRF #38, supplied by Mitsubishi Plastics, Inc.) was prepared. The foamed composition was applied onto the release-treated PET film, dried at 70° C. for 4.5 minutes and at 140° C. for 4.5 minutes, and yielded a foam (foamed sheet) having an open-cell structure. This had a thickness of 130 µm, a density of 0.24 g/cm³, a maximum cell diameter of 69.5 µm, a minimum cell diameter of 15 µm, and an average cell diameter of 34 µm.

Example 25

Materials used were 100 parts by weight of an acrylic emulsion solution (solids content: 55%, an ethyl acrylate-butyl acrylate-acrylonitrile copolymer (weight proportions: 40:45:15)); 3 parts by weight of an ammonium fatty acid salt surfactant (an aqueous dispersion of ammonium stearate, solids content: 33%); and 0.58 part by weight of a poly(acrylic acid) thickener (an ethyl acrylate-acrylic acid copolymer including 20% by weight of acrylic-acid-derived units, solids content: 28.7%). The materials were stirred and mixed using a disper (ROBOMIX, supplied by PRIMIX Corporation) to form foams. Separately, a release-treated poly(ethylene terephthalate) (PET) film (thickness: 38 µm, trade name MRF #38, supplied by Mitsubishi Plastics, Inc.) was prepared. The foamed composition was applied onto the release-treated PET film, dried at 70° C. for 4.5 minutes and at 140° C. for 4.5 minutes, and yielded a foam (foamed sheet) having an open-cell structure. This had a thickness of 150 µm, a density of 0.31 g/cm³, a maximum cell diameter of 187 µm, a minimum cell diameter of 21 µm, and an average cell diameter of 72 µm.

Example 26

Materials used were 100 parts by weight of an acrylic emulsion solution (solids content: 55%, an ethyl acrylate-butyl acrylate-acrylonitrile copolymer having weight proportions of 45:48:7); 3 parts by weight of an ammonium fatty acid salt surfactant (an aqueous dispersion of ammonium stearate, solids content: 33%); 0.35 part by weight of an oxazoline crosslinker (EPOCROS WS-500, supplied by Nippon Shokubai Co., Ltd., solids content: 39%); 0.78 part by weight of a poly(acrylic acid) thickener (an ethyl acrylate-acrylic acid copolymer including 20% by weight of acrylic-acid-derived units, solids content: 28.7%); and 0.5 part by weight of a benzotriazole rust inhibitor (SEETEC BT-NA, supplied by Shipro Kasei Kaisha, Ltd.). The materials were stirred and mixed using a disper (ROBOMIX, supplied by PRIMIX Corporation) to form foams. Separately, a release-treated poly(ethylene terephthalate) (PET) film (thickness: 38 µm, trade name MRF #38, supplied by Mitsubishi Plastics, Inc.) was prepared. The foamed composition was applied onto the release-treated PET film, dried at 70° C. for 4.5 minutes and at 140° C. for 4.5 minutes, and yielded a foam (foamed sheet) having an open-cell structure. This had a thickness of 450 µm, a density of 0.25 g/cm³, a maximum cell diameter of 199 µm, a minimum cell diameter of 24 µm, and an average cell diameter of 84 µm.

Example 27

Materials used were 100 parts by weight of an acrylic emulsion solution (solids content: 55%, an ethyl acrylate-butyl acrylate-acrylonitrile copolymer having weight proportions of 45:48:7); 3 parts by weight of an ammonium fatty acid salt surfactant (an aqueous dispersion of ammonium stearate, solids content: 33%); 0.35 part by weight of an oxazoline crosslinker (EPOCROS WS-500, supplied by Nippon Shokubai Co., Ltd., solids content: 39%); 0.78 part by weight of a poly(acrylic acid) thickener (an ethyl acrylate-acrylic acid copolymer including 20% by weight of acrylic-acid-derived units, solids content: 28.7%); and 0.5 part by weight of a benzotriazole rust inhibitor (SEETEC BT-NA, supplied by Shipro Kasei Kaisha, Ltd.). The materials were stirred and mixed using a disper (ROBOMIX, supplied by PRIMIX Corporation) to form foams. Separately, a release-treated poly(ethylene terephthalate) (PET) film (thickness: 38 µm, trade name MRF #38, supplied by Mitsubishi Plastics, Inc.) was prepared. The foamed composition was applied onto the release-treated PET film, dried at 70° C. for 4.5 minutes and at 140° C. for 4.5 minutes, and yielded a foam (foamed sheet) having an open-cell structure. This had a thickness of 300 µm, a density of 0.25 g/cm³, a maximum cell diameter of 149 µm, a minimum cell diameter of 19 µm, and an average cell diameter of 76 µm.

Evaluations

The foamed sheets prepared in Examples 22 to 27 were subjected to evaluations as in Examples 1 to 17 and subjected to shear bond strength measurements as in Examples 18 to 21. In addition, the foamed sheets were examined to determine their minimum cell diameters (µm) and maximum cell diameters (µm) by the procedure as with the average cell diameter measurement.

Table 4 presents evaluation results. Table 1 presents the loadings (part by weight; in terms of solids content (nonvolatile content)) of the components used in the examples.

As indicated in Table 4, the foamed sheets according to the examples each had a value R of 0.15 or more under the low-impact condition and of 0.10 or more under the high-impact condition and offered excellent impact absorption regardless of the impact magnitude. In addition, the foamed sheets had high shear bond strengths to the SUS 304BA plate. Assume that the foamed sheets are laminated with another member upon use. In this case, the separation and misregistration of the other member is eliminated or minimized without providing a pressure-sensitive adhesive layer on the foamed sheets.

TABLE 4

|  |  | Thickness (µm) | Maximum cell diameter (µm) | Minimum cell diameter (µm) | Average cell diameter (µm) | Density (g/cm³) | Tangent delta temperature (° C.) | Tangent delta maximum (—) | Tangent delta maximum/ density (g/cm³)⁻¹ |
|---|---|---|---|---|---|---|---|---|---|
| Examples | 22 | 130 | 110 | 20 | 45 | 0.33 | −2.52 | 0.42 | 1.27 |
|  | 23 | 130 | 160 | 41 | 101 | 0.43 | −1.07 | 0.43 | 0.99 |
|  | 24 | 130 | 69.5 | 15 | 34 | 0.24 | −5.99 | 0.38 | 1.58 |
|  | 25 | 150 | 187 | 21 | 72 | 0.31 | 8.04 | 0.46 | 1.48 |
|  | 26 | 450 | 199 | 24 | 84 | 0.25 | −4.21 | 0.38 | 1.52 |
|  | 27 | 300 | 149 | 19 | 76 | 0.25 | −5.05 | 0.40 | 1.60 |

TABLE 4-continued

| | | Initial elastic modulus (N/mm$^2$) | Impact absorption rate (28-g iron ball, at rise angle of 40°) | | Impact absorption rate (96-g iron ball, at rise angle of 47°) | | Shear bond strength | |
|---|---|---|---|---|---|---|---|---|
| | | | (%) | (%)/thickness (μm) | (%) | (%)/thickness (μm) | (N/100 mm$^2$) | Failure portion |
| Examples | 22 | 0.32 | 33.44 | 0.26 | 19.92 | 0.15 | 32 | Interface |
| | 23 | 0.48 | 27.98 | 0.22 | 18.73 | 0.14 | 4.8 | Interface |
| | 24 | 0.32 | 27.81 | 0.21 | 15.75 | 0.12 | 24 | Interface |
| | 25 | 0.40 | 24.50 | 0.19 | 24.95 | 0.19 | 20 | Interface |
| | 26 | 0.20 | 69.79 | 0.16 | 53.34 | 0.12 | 8 | Interface |
| | 27 | 0.21 | 60.32 | 0.20 | 39.97 | 0.13 | 9.6 | Interface |

Example 28

Materials used were 100 parts by weight of an acrylic emulsion solution (solids content: 55%, an ethyl acrylate-butyl acrylate-acrylonitrile copolymer having weight proportions of 45:48:7); 3 parts by weight of an ammonium fatty acid salt surfactant (an aqueous dispersion of ammonium stearate, solids content: 33%) (surfactant A); 0.35 part by weight of an oxazoline crosslinker (EPOCROS WS-500, supplied by Nippon Shokubai Co., Ltd., solids content: 39%); 0.76 part by weight of a pigment (carbon black) (NAF-5091, supplied by Dainichiseika Color & Chemicals Mfg. Co., Ltd.); 0.78 part by weight of a poly(acrylic acid) thickener (an ethyl acrylate-acrylic acid copolymer including 20% by weight of acrylic-acid-derived units, solids content: 28.7%); 0.5 part by weight of a benzotriazole rust inhibitor (SEETEC BT-NA, supplied by Shipro Kasei Kaisha, Ltd.); and 5 parts by weight of sodium hydrogencarbonate (CELLBORN FE-507, supplied by EIWA CHEMICAL IND. CO., LTD). The materials were stirred and mixed using a disper (ROBOMIX, supplied by PRIMIX Corporation) to form foams. Separately, a release-treated poly(ethylene terephthalate) (PET) film (thickness: 38 μm, trade name MRF #38, supplied by Mitsubishi Plastics, Inc.) was prepared. The foamed composition was applied onto the release-treated PET film, dried at 70° C. for 4.5 minutes and at 140° C. for 4.5 minutes, and yielded a foam (foamed sheet) having an open-cell structure. This had a thickness of 120 μm, a density of 0.32 g/cm$^3$, a volume percentage of cells of 67.8%, a maximum cell diameter of 113 μm, a minimum cell diameter of 24 μm, and an average cell diameter of 47 μm.

Example 29

Materials used were 100 parts by weight of an acrylic emulsion solution (solids content: 55%, an ethyl acrylate-butyl acrylate-acrylonitrile copolymer having weight proportions of 45:48:7); 3 parts by weight of an ammonium fatty acid salt surfactant (an aqueous dispersion of ammonium stearate, solids content: 33%) (surfactant A); 0.35 part by weight of an oxazoline crosslinker (EPOCROS WS-500, supplied by Nippon Shokubai Co., Ltd., solids content: 39%); 0.76 part by weight of a pigment (carbon black) (NAF-5091, supplied by Dainichiseika Color & Chemicals Mfg. Co., Ltd.); 0.78 part by weight of a poly(acrylic acid) thickener (an ethyl acrylate-acrylic acid copolymer including 20% by weight of acrylic-acid-derived units, solids content: 28.7%); 0.5 part by weight of a benzotriazole rust inhibitor (SEETEC BT-NA, supplied by Shipro Kasei Kaisha, Ltd.); and 1 part by weight of microcapsules (Matsumoto Microsphere F-501D, supplied by Matsumoto Yushi-Seiyaku Co., Ltd.). The materials were stirred and mixed using a disper (ROBOMIX, supplied by PRIMIX Corporation) to form foams. Separately, a release-treated poly(ethylene terephthalate) (PET) film (thickness: 38 μm, trade name MRF #38, supplied by Mitsubishi Plastics, Inc.) was prepared. The foamed composition was applied onto the release-treated PET film, dried at 70° C. for 4.5 minutes and at 140° C. for 4.5 minutes, and yielded a foam (foamed sheet) having an open-cell structure. This had a thickness of 130 μm, a density of 0.39 g/cm$^3$, a volume percentage of cells of 61.5%, a maximum cell diameter of 70 μm, a minimum cell diameter of 22 μm, and an average cell diameter of 49 μm.

Example 30

Materials used were 100 parts by weight of an acrylic emulsion solution (solids content: 55%, an ethyl acrylate-butyl acrylate-acrylonitrile copolymer having weight proportions of 45:48:7); 3 parts by weight of an ammonium fatty acid salt surfactant (an aqueous dispersion of ammonium stearate, solids content: 33%) (surfactant A); 0.35 part by weight of an oxazoline crosslinker (EPOCROS WS-500, supplied by Nippon Shokubai Co., Ltd., solids content: 39%); 0.76 part by weight of a pigment (carbon black) (NAF-5091, supplied by Dainichiseika Color & Chemicals Mfg. Co., Ltd.); 0.78 part by weight of a poly(acrylic acid) thickener (an ethyl acrylate-acrylic acid copolymer including 20% by weight of acrylic-acid-derived units, solids content: 28.7%); 0.5 part by weight of a benzotriazole rust inhibitor (SEETEC BT-NA, supplied by Shipro Kasei Kaisha, Ltd.); and 1 part by weight of mica (ME-100, supplied by CO-OP CHEMICAL CO., LTD.). The materials were stirred and mixed using a disper (ROBOMIX, supplied by PRIMIX Corporation) to form foams. Separately, a release-treated poly(ethylene terephthalate) (PET) film (thickness: 38 μm, trade name MRF #38, supplied by Mitsubishi Plastics, Inc.) was prepared. The foamed composition was applied onto the release-treated PET film, dried at 70° C. for 4.5 minutes and at 140° C. for 4.5 minutes, and yielded a foam (foamed sheet) having an open-cell structure. This had a thickness of 120 μm, a density of 0.38 g/cm$^3$, a volume percentage of cells of 61.8%, a maximum cell diameter of 125 μm, a minimum cell diameter of 23 μm, and an average cell diameter of 70 μm.

Example 31

Materials used were 100 parts by weight of an acrylic emulsion solution (solids content: 55%, an ethyl acrylate-butyl acrylate-acrylonitrile copolymer having weight proportions of 45:48:7); 3 parts by weight of an ammonium fatty acid salt surfactant (an aqueous dispersion of ammonium stearate, solids content: 33%) (surfactant A); 0.35 part by weight of an oxazoline crosslinker (EPOCROS WS-500, supplied by Nippon Shokubai Co., Ltd., solids content: 39%); 0.76 part by weight of a pigment (carbon black) (NAF-5091, supplied by Dainichiseika Color & Chemicals Mfg. Co., Ltd.); 0.78 part by weight of a poly(acrylic acid) thickener (an ethyl acrylate-acrylic acid copolymer including 20% by weight of acrylic-acid-derived units, solids content: 28.7%); 0.5 part by weight of a benzotriazole rust inhibitor (SEETEC BT-NA, supplied by Shipro Kasei Kaisha, Ltd.); and 20 parts by weight of barium titanate (BT-03, supplied by Sakai Chemical Industry Co., Ltd.). The materials were stirred and mixed using a disper (ROBOMIX, supplied by PRIMIX Corporation) to form foams. Separately, a release-treated poly(ethylene terephthalate) (PET) film (thickness: 38 μm, trade name MRF #38, supplied by Mitsubishi Plastics, Inc.) was prepared. The foamed composition was applied onto the release-treated PET film, dried at 70° C. for 4.5 minutes and at 140° C. for 4.5 minutes, and yielded a foam (foamed sheet) having an open-cell structure. This had a thickness of 120 μm, a density of 0.42 g/cm$^3$, a volume percentage of cells of 57.9%, a maximum cell diameter of 114 μm, a minimum cell diameter of 17 μm, and an average cell diameter of 53 μm.

Example 32

Materials used were 100 parts by weight of an acrylic emulsion solution (solids content: 55%, an ethyl acrylate-butyl acrylate-acrylonitrile copolymer having weight proportions of 45:48:7); 3 parts by weight of an ammonium fatty acid salt surfactant (an aqueous dispersion of ammonium stearate, solids content: 33%) (surfactant A); 0.35 part by weight of an oxazoline crosslinker (EPOCROS WS-500, supplied by Nippon Shokubai Co., Ltd., solids content: 39%); 0.76 part by weight of a pigment (carbon black) (NAF-5091, supplied by Dainichiseika Color & Chemicals Mfg. Co., Ltd.); 0.78 part by weight of a poly(acrylic acid) thickener (an ethyl acrylate-acrylic acid copolymer including 20% by weight of acrylic-acid-derived units, solids content: 28.7%); 0.5 part by weight of a benzotriazole rust inhibitor (SEETEC BT-NA, supplied by Shipro Kasei Kaisha, Ltd.); 20 parts by weight of barium titanate (BT-03, supplied by Sakai Chemical Industry Co., Ltd.); and 20 parts by weight of electroconductive titanium oxide (FT-2000, supplied by ISHIHARA SANGYO KAISHA, LTD.; rutile acicular titanium dioxide coated with a SnO$_2$/Sb electroconductive layer). The materials were stirred and mixed using a disper (ROBOMIX, supplied by PRIMIX Corporation) to form foams. Separately, a release-treated poly(ethylene terephthalate) (PET) film (thickness: 38 μm, trade name MRF #38, supplied by Mitsubishi Plastics, Inc.) was prepared. The foamed composition was applied onto the release-treated PET film, dried at 70° C. for 4.5 minutes and at 140° C. for 4.5 minutes, and yielded a foam (foamed sheet) having an open-cell structure. This had a thickness of 130 μm, a density of 0.35 g/cm$^3$, a volume percentage of cells of 65.4%, a maximum cell diameter of 116 μm, a minimum cell diameter of 28 μm, and an average cell diameter of 69 μm.

Example 33

Materials used were 90 parts by weight of an acrylic emulsion solution (solids content: 55%, an ethyl acrylate-butyl acrylate-acrylonitrile copolymer having weight proportions of 45:48:7); 10 parts by weight of a synthetic rubber emulsion (Lacstar 1570B, supplied by DIC Corporation, solids content: 42.4%, NBR); 3 parts by weight of an ammonium fatty acid salt surfactant (an aqueous dispersion of ammonium stearate, solids content: 33%) (surfactant A); 0.35 part by weight of an oxazoline crosslinker (EPOCROS WS-500, supplied by Nippon Shokubai Co., Ltd., solids content: 39%); and 0.8 part by weight of a poly(acrylic acid) thickener (an ethyl acrylate-acrylic acid copolymer including 20% by weight of acrylic-acid-derived units, solids content: 28.7%). The materials were stirred and mixed using a disper (ROBOMIX, supplied by PRIMIX Corporation) to form foams. Separately, a release-treated poly(ethylene terephthalate) (PET) film (thickness: 38 μm, trade name MRF #38, supplied by Mitsubishi Plastics, Inc.) was prepared. The foamed composition was applied onto the release-treated PET film, dried at 70° C. for 4.5 minutes and at 140° C. for 4.5 minutes, and yielded a foam (foamed sheet) having an open-cell structure. This had a thickness of 130 μm, a density of 0.43 g/cm$^3$, a volume percentage of cells of 56.8%, a maximum cell diameter of 168 μm, a minimum cell diameter of 29 μm, and an average cell diameter of 70 μm.

Evaluations

The foamed sheets prepared in Examples 28 to 33 were subjected to evaluations as above.

Table 5 presents evaluation results. Table 1 presents the loadings (part by weight; in terms of solids content (non-volatile content)) of the components used in the examples.

As indicated in Table 5, the foamed sheets according to the examples each had a value R of 0.15 or more under the low-impact condition and of 0.10 or more under the high-impact condition and offered excellent impact absorption regardless of the impact magnitude.

TABLE 5

|  |  | Thickness (μm) | Maximum cell diameter (μm) | Minimum cell diameter (μm) | Average cell diameter (μm) | Density (g/cm$^3$) | Tangent delta temperature (° C.) | Tangent delta maximum (—) | Tangent delta maximum/ density (g/cm$^3$)$^{-1}$ |
|---|---|---|---|---|---|---|---|---|---|
| Examples | 28 | 120 | 113 | 24 | 47 | 0.32 | −2 | 0.49 | 1.53 |
|  | 29 | 130 | 70 | 22 | 49 | 0.39 | −0.1 | 0.46 | 1.18 |
|  | 30 | 120 | 125 | 23 | 70 | 0.38 | 0 | 0.46 | 1.21 |
|  | 31 | 120 | 114 | 17 | 53 | 0.42 | −7.1 | 0.43 | 1.02 |

TABLE 5-continued

| | | | | | | | | |
|---|---|---|---|---|---|---|---|---|
| 32 | 130 | 116 | 28 | 69 | 0.35 | −5.2 | 0.50 | 1.43 |
| 33 | 130 | 168 | 29 | 70 | 0.43 | −1 | 0.56 | 1.30 |

| | | Initial elastic modulus (N/mm²) | Impact absorption rate (28-g iron ball, at rise angle of 40°) | | Impact absorption rate (96-g iron ball, at rise angle of 47°) | |
|---|---|---|---|---|---|---|
| | | | (%) | Impact absorption rate (%)/thickness (μm) | (%) | Impact absorption rate (%)/thickness (μm) |
| Examples | 28 | 0.75 | 41.1 | 0.34 | 20.2 | 0.17 |
| | 29 | 0.44 | 40.9 | 0.31 | 16.2 | 0.12 |
| | 30 | 0.52 | 40.3 | 0.34 | 14.6 | 0.12 |
| | 31 | 0.45 | 40.3 | 0.34 | 12.5 | 0.10 |
| | 32 | 0.48 | 43.9 | 0.34 | 14.3 | 0.11 |
| | 33 | 0.49 | 41.4 | 0.32 | 16.7 | 0.13 |

INDUSTRIAL APPLICABILITY

The foamed sheets according to the present invention have excellent impact absorption even when having small thicknesses. The foamed sheets according to the present invention, when incorporated into electrical/electronic devices, eliminate or minimize the failure typically of displays due to impacts even if the electrical/electronic device drops onto the ground. The foamed sheets are therefore useful particularly as shock absorbing sheets for low-profile electrical/electronic devices.

REFERENCE SIGNS LIST

1 pendulum impact tester (impact testing apparatus)
2 test specimen (foamed sheet)
3 holder
4 impact loader
5 pressure sensor
11 fixture
12 presser
16 pressing force controller
20 support
21 arm
22 one end of pendulum arm (shaft)
23 pendulum arm (shaft)
24 impactor
25 electromagnet
28 backing plate
"a" rise angle

The invention claimed is:

1. A foamed sheet having a thickness of 30 to 500 μm and comprising
   a foam having a density of 0.2 to 0.7 g/cm³ and an average cell diameter of 10 to 150 μm, the foam having a peak top of loss tangent (tan δ) occurring in a temperature range of from −30° C. to 30° C., where the loss tangent (tan δ) is specified as a ratio of a loss modulus to a storage modulus each determined at an angular frequency of 1 rad/s in dynamic viscoelastic measurement of the foam, and
   the foam has an initial elastic modulus of 1.93 N/mm² or less in a tensile test at a tensile speed of 300 mm/min and at an ambient temperature of 23° C.

2. The foamed sheet according to claim 1,
   wherein the foam has a maximum of loss tangent (tan δ) in the temperature range of from −30° C. to 30° C. of 0.2 or more.

3. The foamed sheet according to claim 1,
   wherein a value R is 0.15 or more at an impactor weight of 28 g and a rise angle of 40° and is 0.10 or more at an impactor weight of 96 g and a rise angle of 47°, where the value R is determined by dividing an impact absorption rate (%) by the thickness (μm) of the foamed sheet, and where the impact absorption rate is determined in an impact test using a pendulum impact tester and specified by an expression:

Impact absorption rate (%)=[($F_0$−$F_1$)/$F_0$]×100 wherein:
   $F_0$ represents an impact force upon collision of an impactor with a backing plate alone; and
   $F_1$ represents an impact force upon collision of the impactor with the backing plate in a structure including the backing plate and the foamed sheet.

4. The foamed sheet according to claim 1,
   wherein at least one side of the foam has a shear bond strength of 0.5 N/100 mm² or more to a SUS 304BA plate, where the shear bond strength is determined at 23° C. and at a tensile speed of 50 mm/min.

5. The foamed sheet according to claim 1,
   wherein the foam is derived from at least one resinous material selected from the group consisting of acrylic polymers, rubbers, urethane polymers, and ethylene-vinyl acetate copolymers.

6. The foamed sheet according to claim 1,
   wherein the foam is formed via a step A of mechanically foaming an emulsion resin composition to give a foamed emulsion resin composition containing bubbles.

7. The foamed sheet according to claim 6,
   wherein the foam is formed further via a step B of applying the mechanically foamed emulsion resin composition onto a substrate and drying the applied composition.

8. The foamed sheet according to claim 7,
   wherein the drying in the step B comprises:
   a preliminary drying step B1 of drying the applied foamed emulsion resin composition on the substrate at a temperature of from 50° C. to lower than 125° C.; and
   a drying step B2 of further drying the preliminarily dried foamed emulsion resin composition at a temperature of from 125° C. to 200° C.

9. The foamed sheet according to claim 1, further comprising
   a pressure-sensitive adhesive layer on or above at least one side of the foam.

10. The foamed sheet according to claim 1,
wherein the foamed sheet is used as a shock absorbing sheet for electrical/electronic devices.

11. An electrical/electronic device comprising the foamed sheet according to claim 1.

12. The electrical/electronic device according to claim 11, further comprising:
a display member; and
a cabinet,
wherein the electrical/electronic device has such a structure that the foamed sheet is held between the cabinet and the display member.

13. The foamed sheet according to claim 5, the acrylic polymers are derived from monomer components essentially including a monomer that gives a homopolymer having a glass transition temperature Tg of 10° C. or higher, and a monomer that gives a homopolymer having a glass transition temperature Tg of lower than 10° C.

14. The foamed sheet according to claim 1, wherein the foam comprises a surfactant.

15. The foamed sheet according to claim 14, wherein foam further comprises a resinous material and the solid content of the surfactant is 0.5 to 10 parts by weight per 100 parts by weight of the solid content of the resinous material.

16. The foamed sheet according to claim 1, wherein the foam comprises an azole-ring-containing compound as a rust inhibitor.

17. The foamed sheet according to claim 16, wherein the foam further comprises a resinous material and the solid content of the rust inhibitor is 0.2 to 5 parts by weight per 100 parts by weight of the solid content of the resinous material.

* * * * *